United States Patent
Xin et al.

(10) Patent No.: US 10,743,194 B2
(45) Date of Patent: Aug. 11, 2020

(54) METHOD AND APPARATUS FOR PERFORMING ASSOCIATION BEAMFORMING TRAINING IN A WIRELESS NETWORK

(71) Applicants: Yan Xin, Kanata (CA); Sheng Sun, Kanata (CA); Osama Aboul-Magd, Kanata (CA)

(72) Inventors: Yan Xin, Kanata (CA); Sheng Sun, Kanata (CA); Osama Aboul-Magd, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/272,584

(22) Filed: Sep. 22, 2016

(65) Prior Publication Data
US 2017/0118656 A1    Apr. 27, 2017

Related U.S. Application Data

(60) Provisional application No. 62/245,861, filed on Oct. 23, 2015, provisional application No. 62/277,257, filed on Jan. 11, 2016.

(51) Int. Cl.
*H04J 11/00* (2006.01)
*H04W 16/28* (2009.01)
(Continued)

(52) U.S. Cl.
CPC .......... *H04W 16/28* (2013.01); *H04B 7/0452* (2013.01); *H04B 7/0619* (2013.01);
(Continued)

(58) Field of Classification Search
CPC ....... H04W 48/16; H04W 8/26; H04W 16/28; H04W 72/0446; H04W 40/244;
(Continued)

(56) References Cited

U.S. PATENT DOCUMENTS

| 8,254,752 B2 * | 8/2012 | Ryu | H04N 5/76 348/222.1 |
| 8,625,565 B2 * | 1/2014 | Cordeiro | H04B 7/0617 370/339 |

(Continued)

FOREIGN PATENT DOCUMENTS

| CN | 102026341 A | 4/2011 |
| CN | 102036258 A | 4/2011 |

(Continued)

OTHER PUBLICATIONS

IEEE Standard for information technology—Telecommunications and information exchange between systems Local and metropolitan area networks, Part 11: Wireless LAN Medium Access Control (MAC) and Physical Layer (PHY) Specifications, IEEE Std 802.11ad, Dec. 28, 2012.

(Continued)

*Primary Examiner* — Hanh N Nguyen

(57) ABSTRACT

An association beamforming training (A-BFT) method between an access point communicatively coupleable to a plurality of stations through a plurality of channels is described. The method includes: receiving a first sector sweep (SSW) frame from a first station on a first channel; receiving a second SSW frame from a second station on a second channel; processing the first and second SSW frames to determine corresponding first and second sector sweep feedback (SSW-feedback) frames; and transmitting the first and second SSW-feedback frames to the first and second stations, respectively, wherein the second SSW frame may be orthogonal to the first SSW frame, and wherein the first SSW frame may be spread using a first spreading sequence, the second SSW frame may be spread using a second spreading sequence, and wherein the first and second spreading sequences are mutually orthogonal.

30 Claims, 28 Drawing Sheets

(51) Int. Cl.

| | | |
|---|---|---|
| *H04B 7/06* | (2006.01) | |
| *H04B 7/0452* | (2017.01) | |
| *H04B 7/08* | (2006.01) | |
| *H04W 40/24* | (2009.01) | |
| *H04W 72/04* | (2009.01) | |
| *H04W 84/12* | (2009.01) | |

(52) U.S. Cl.
CPC ........... *H04B 7/0695* (2013.01); *H04B 7/088* (2013.01); *H04W 40/244* (2013.01); *H04W 72/0446* (2013.01); *H04W 84/12* (2013.01)

(58) Field of Classification Search
CPC ..... H04W 48/10; H04W 80/04; H04W 24/02; H04W 7/04; H04B 7/0684; H04B 7/0617; H04B 7/0417; H04B 1/707; H04B 7/0686; H04B 7/0421; H04B 7/0452; H04L 7/0091; H04L 5/00092; H04L 1/0009; H04L 5/0053
See application file for complete search history.

(56) References Cited

U.S. PATENT DOCUMENTS

| | | | | |
|---|---|---|---|---|
| 8,743,838 B2* | 6/2014 | Gong | ................... | H04B 7/0617 370/334 |
| 9,312,985 B2* | 4/2016 | Sanderovich | ......... | H04L 1/0033 |
| 9,356,647 B2* | 5/2016 | Lee | ....................... | H04B 7/0626 |
| 9,628,260 B1* | 4/2017 | Zhang | .................. | H04W 56/00 |
| 9,680,546 B2* | 6/2017 | Trainin | ................ | H04B 7/0617 |
| 9,712,221 B2* | 7/2017 | Trainin | ................ | H04B 7/0617 |
| 9,722,726 B2* | 8/2017 | Kasher | ................. | H04L 1/0001 |
| 9,854,607 B1* | 12/2017 | Chu | ................... | H04W 52/241 |
| 9,960,877 B2* | 5/2018 | Cordeiro | ............. | H04J 13/0014 |
| 9,998,184 B2* | 6/2018 | Kasher | ................... | H04B 7/043 |
| 2011/0013603 A1 | 1/2011 | Li et al. | | |
| 2011/0064033 A1 | 3/2011 | Gong et al. | | |
| 2011/0080898 A1 | 4/2011 | Cordeiro et al. | | |
| 2014/0072078 A1 | 3/2014 | Sergeyev et al. | | |
| 2014/0112317 A1 | 4/2014 | Liu et al. | | |
| 2014/0314053 A1 | 10/2014 | Liu et al. | | |
| 2015/0244432 A1 | 8/2015 | Wang | | |
| 2015/0249929 A1 | 9/2015 | Irie et al. | | |
| 2018/0301804 A1 | 10/2018 | Gao et al. | | |

FOREIGN PATENT DOCUMENTS

| | | |
|---|---|---|
| CN | 103718591 A | 4/2014 |
| CN | 104509148 A | 4/2015 |
| JP | 2012507946 A | 3/2012 |
| JP | 2012524459 A | 10/2012 |
| JP | 2013504974 A | 2/2013 |
| JP | 2013507088 A | 2/2013 |
| JP | 2015164271 A | 9/2015 |
| RU | 2498505 C2 | 11/2013 |
| WO | 2014071308 A1 | 5/2014 |
| WO | 2015099750 A1 | 7/2015 |

OTHER PUBLICATIONS

Information technology—Telecommunications and Information exchange between Systems—Local and metropolitan area networks—Specific requirements—Part 11:Wireless LAN medium access control (MAC) and physical layer (PHY) specifications Amendment 3: Enhancements for very high throughput in the 60 GHz band(adoption of IEEE Std 802.11ad-2012), Mar. 15, 2014. pages 1-634, XP068070330.

* cited by examiner

- SSW frame format

- SSW-Feedback frame format

FIG. 10A

| Sector Select | DMG Antenna Select | SNR Report | Poll Required | Channel Select | Reserved |
|---|---|---|---|---|---|
| B0  B5 | B6  B7 | B8  B15 | B16 | B17  B18 | B19  B23 |
| 6 | 2 | 8 | 1 | 2 | 5 |

| Sector Select | DMG Antenna Select | SNR Report | Poll Required | Channel Select | Reserved |
|---|---|---|---|---|---|
| B0  B5 | B6  B7 | B8  B15 | B16 | B17  B19 | B20  B23 |
| 6 | 2 | 8 | 1 | 3 | 4 |

105, 107

The Sequence Ga128New1, to be transmitted from left to right, up to down — 122

The Sequence Gb128New1, to be transmitted from left to right, up to down — 124

The Sequence G1New(n), to be transmitted from left to right
+1 +1 +1 +1 +1 -1 -1 -1 -1 +1 +1 -1 -1 +1 +1 -1 +1 -1 +1 -1 +1 -1 +1 -1 +1 +1 -1 -1 +1 +1 -1 -1

FIG. 17A

The Sequence G2New(n), to be transmitted from left to right
-1 +1 -1 -1 +1 +1 +1 +1 -1 +1 +1 -1 -1 +1 +1 -1 -1 +1 -1 +1 +1 -1 +1 -1 -1 -1 +1 +1 -1 -1 -1 -1

FIG. 17B

METHOD AND APPARATUS FOR PERFORMING ASSOCIATION BEAMFORMING TRAINING IN A WIRELESS NETWORK

CROSS-REFERENCE TO RELATED APPLICATIONS

This application claims the benefit of U.S. Provisional Patent Application Ser. No. 62/245,861 titled "Method and Apparatus for Performing Association Beamforming Training in a Wireless Network" filed on Oct. 23, 2015 and U.S. Provisional Patent Application Ser. No. 62/277,257 titled "Method and Apparatus for Performing Association Beamforming Training in a Wireless Network" filed on Jan. 11, 2016, which are incorporated by reference herein in their entirety.

FIELD OF THE INVENTION

The present invention pertains to the field of wireless network communications, and in particular to a method and apparatus for performing Responder Sector Sweep (RSS) in Association Beamforming Training (A-BFT).

BACKGROUND

A number of Wi-Fi protocols exist for establishing wireless personal and local area network (WPAN/WLAN) communications between devices. Some protocols involving devices with antennas require the use of complex discovery and beamforming functions to establish directional links for certain carrier frequencies; this ensures properly aligned transmitter and receiver antennas have enough antenna gains to achieve sufficient Signal to Noise Ratio (SNR) in order to meet link requirements (i.e. 'link budgets').

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for Association Beamforming Training (A-BFT).

In accordance with embodiments of the present invention, there is provided an association beamforming training (A-BFT) method between an access point (AP) or personal basic service set (PBSS) control point (PCP) communicatively coupleable to a plurality of stations through a plurality of channels. The method comprising: a first STA selecting a first sector sweep (SSW) slot and a first channel before a first station sends a first SSW frame to PCP/AP; a second STA selecting a second sector sweep (SSW) slot and a second channel before a second station sends a second SSW frame to PCP/AP; transmitting the first sector sweep (SSW) frame from the first station in the first SSW slot and on the first channel; transmitting the second sector sweep (SSW) frame from the second station in the second SSW slot and on the second channel; receiving the first sector sweep (SSW) frame from the first station on the first channel; receiving the second SSW frame from the second station on the second channel; processing the first and second SSW frames to determine corresponding first and second sector sweep feedback (SSW-feedback) frames; and transmitting the first and second SSW-feedback frames to the first and second stations, respectively.

In accordance with embodiments of the present invention, there is provided an association beamforming training (A-BFT) method comprising: performing (by STA) a clear channel assessment (CCA) function in the period of the first sector sweep (SSW) frame of an SSW slot to determine if the SSW slot is busy; transmitting SSW frames during the SSW slot when it is not busy; and choosing another SSW slot to transmit SSW frames when the SSW slot is busy.

In accordance with embodiments of the present invention, there is provided a method for communicating a selected channel for a sector during association beamforming training (A-BFT). The method comprising transmitting a frame comprising a channel select subfield indicating the selected channel.

In accordance with embodiments of the present invention, there is provided an association beamforming training (A-BFT) method. The method comprising: selecting and transmitting a sector sweep (SSW) frame from a first station; selecting and transmitting an evolved sector sweep (E-SSW) frame from a second station, the E-SSW frame orthogonal to the SSW frame; receiving a sector sweep (SSW) frame from a first station; receiving an evolved sector sweep (E-SSW) frame from a second station; processing the SSW and E-SSW frames to determine corresponding sector sweep feedback (SSW-feedback) frames; and transmitting the corresponding SSW-feedback frames to the first and second stations.

In accordance with embodiments of the present invention, there is provided an association beamforming training (A-BFT) method. The method comprising: receiving a first sector sweep (SSW) frame from a first station; receiving a second SSW frame from a second station, the second SSW frame being orthogonal to the first SSW frame; processing the first and second SSW frames to determine corresponding sector sweep feedback (SSW-feedback) frames; and transmitting the corresponding SSW-feedback frames to the first and second stations, respectively, wherein the first SSW frame is spread using a first spreading sequence, the second SSW frame is spread using a second spreading sequence, and the first and second spreading sequences are mutually orthogonal.

BRIEF DESCRIPTION OF THE FIGURES

Further features and advantages of the present invention will become apparent from the following detailed description, taken in combination with the appended drawings, in which:

FIG. 10A is a Sector Sweep Feedback field format in SSW/SSW-Feedback frames comprising a 2-bit Channel Select subfield, according to embodiments of the present invention;

FIG. 10B is a Sector Sweep Feedback field format in for SSW/SSW-Feedback frames comprising a 3-bit Channel Select subfield, according to embodiments of the present invention;

FIG. 12A is a 128 bit Golay sequence which is orthogonal to Ga128, that may be used to form the short training field (STF) of an E-SSW frame, according to embodiments of the present invention;

FIG. 12B is a 128 bit Golay sequence which is orthogonal to Gb128, that may be used to form the short training field (STF) of an E-SSW frame, according to embodiments of the present invention;

FIGS. 17A and 17B are 32 bit Golay sequences which may be used as first and second spreading sequences (G1New(n) and G2New(n)) such that they are mutually orthogonal within a zero correlation zone (ZCZ), having the same sequence length, according to embodiments of the present invention;

DETAILED DESCRIPTION

Beamforming is a wireless communication technique employed in various Wi-Fi protocols, for example in protocol IEEE 802.11ad, due to their relatively small form factors of antenna arrays associated with the 60 GHz band. Beamforming can be performed on the transmitter side (for example, using an Initiator Sector Sweep (ISS)) TXSS and a Responder Sector Sweep (RSS) TXSS, on the receiver side (for example, using an ISS RXSS and a RSS RXSS), or both, to ensure that emissions of respective antennas are aligned to provide enough gain and to minimize interference from other devices.

Figure 1:
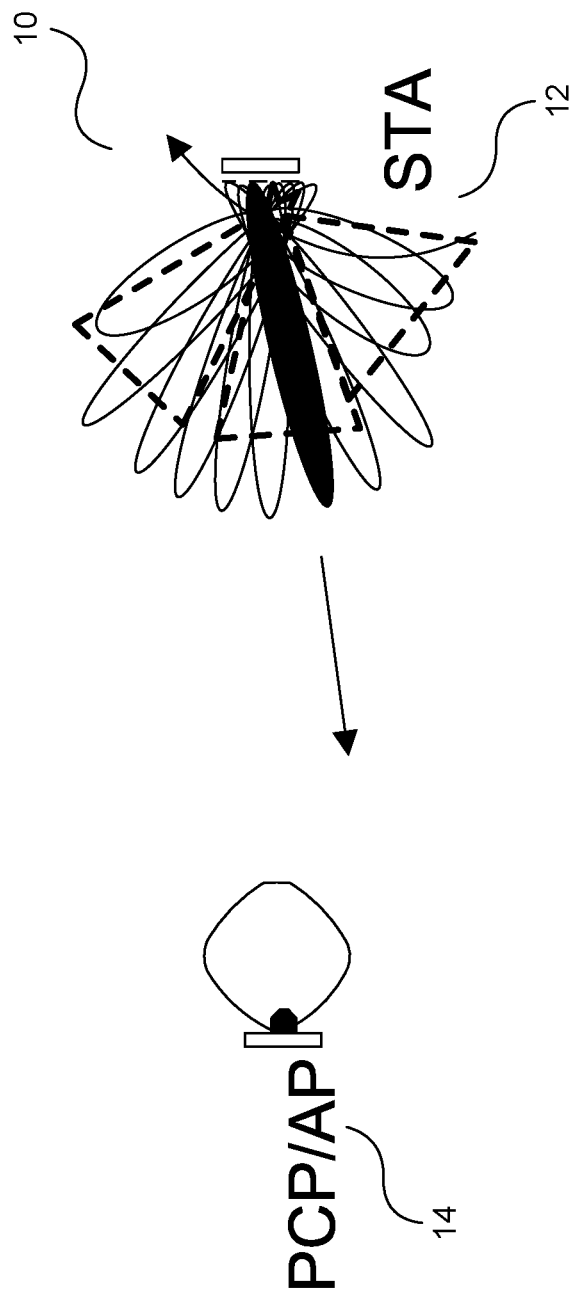
FIG. 1 illustrates responder sector sweep (RSS) beamforming between a station (STA) and a personal basic service set control point/access point (PCP/AP)

FIG. 1 is an example illustration of responder sector sweep (e.g. RSS) beamforming 10 performed between a Station (STA) 12, such as a User Equipment (UE), phone, laptop, computer, or any device capable of using IEEE 802.11 protocol and a personal basic service set control point/access point (PCP/AP) 14. The STA undergoes a protocol in which it sends training frames in the form of a Sector Sweep (SSW) frames from one or more sectors to the PCP/AP according to its distinct antenna radiation patterns. The PCP/AP then responds with feedback (SSW-Feedback) that provides the STA information about the best sector and measured quality. The SSW and SSW-Feedback frames are exchanged over a single channel between the devices (e.g. half-duplex). The STA uses the SSW-Feedback to choose the best sector to use for transmitting to the PCP/AP thereafter. When beamforming is performed amongst multiple STAs, the simultaneous transmission of SSW frames from different STAs can result in collisions which can effectively delay, reduce efficiency, or render ineffective the beamforming process. This problem is explained in further detail below.

Figure 2:
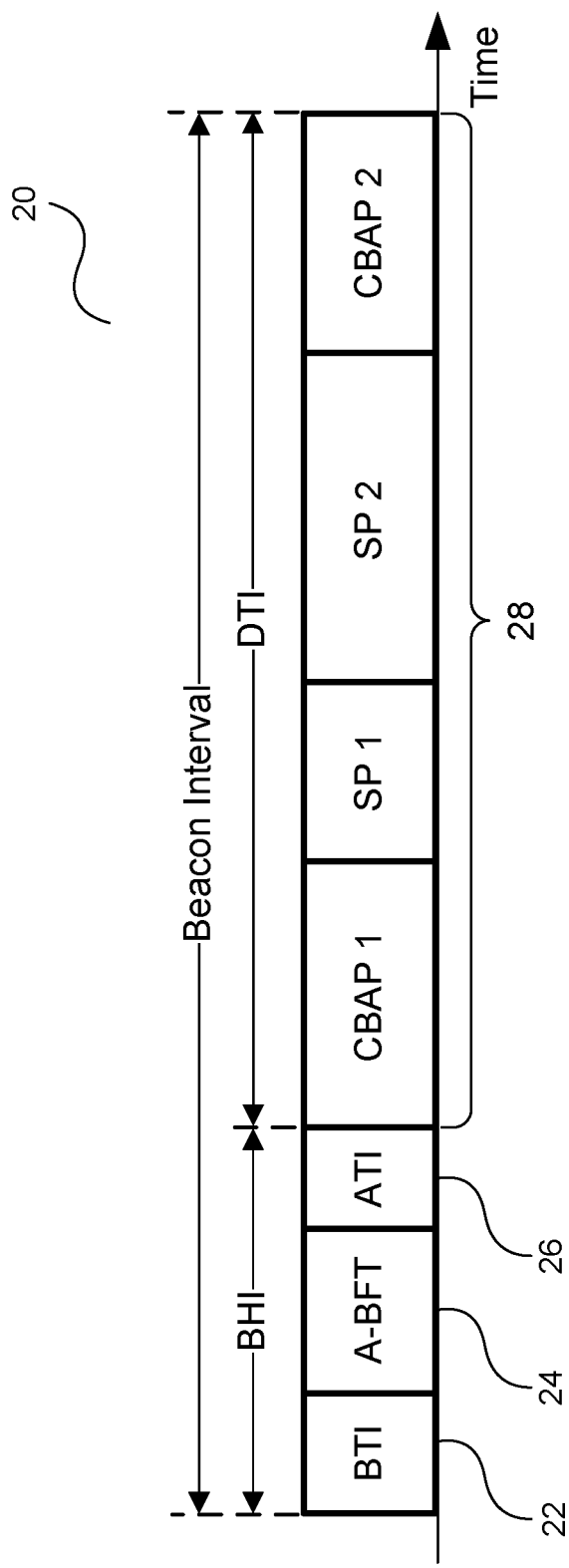
FIG. 2 is an example access period within a Beacon Interval.

FIG. 2 is an example channel access period within a Beacon Interval 20, which illustrates the signaling structure used for gaining and accessing a channel under certain Wi-Fi protocols. As shown, the Beacon Interval comprises: Beacon Transmission Interval (BTI) 22, Association Beamforming Training Interval (A-BFT) 24, Announcement Transmission Interval (ATI) 26 and Data Transfer Interval (DTI) 28 are used for establishing channel access for transmission of Beacon frames, control frames, management frames and data frames as well as for beamforming performed between a PCP/AP and an STA.

As shown in FIG. 2, a Beacon Transmission Interval (BTI) 22 is an access period during which one or more Directional Multi Gigabit (DMG) Beacon frames are transmitted (in BTI, a DMG PCP/AP can perform Sector Level Sweep (SLS) beamforming and broadcast information in a DMG Beacon); an Association Beamforming Training (A-BFT) 24 period is an access period during which SLS beamforming training is performed with the PCP/AP having transmitted a DMG Beacon frame in a preceding BTI (transmitted frames in A-BFT include SSW and SSW-feedback frames); an Announcement Transmission Interval (ATI) 26 is an access period during which management information between PCP/AP and non-PCP/non-AP STAs are exchanged (transmitted frames in ATI may include management frames (e.g., Information Request/Response, Association request/response, etc.)); the DTI 28 is an access period during which frame exchanges are performed between PCP/AP and STAs or between STAs. There is a single DTI per beacon interval. The DTI further comprises one or more scheduled service periods (SP 1, SP 2), and a contention-based access period (CBAP1, CBAP 2).

Figure 3:
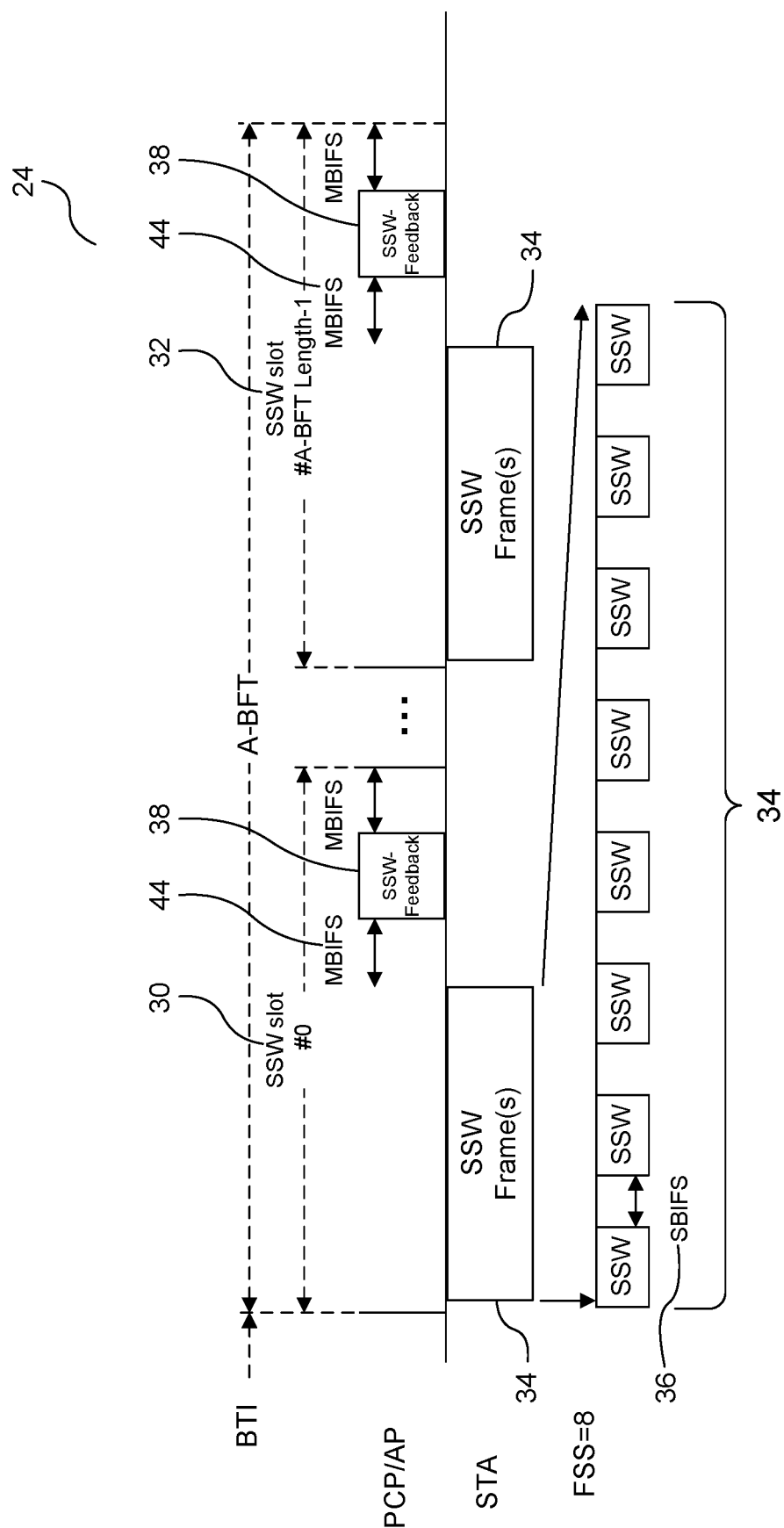
FIG. 3 is an example timing diagram illustrating the operations that occurs during an A-BFT period.
Figure 4:
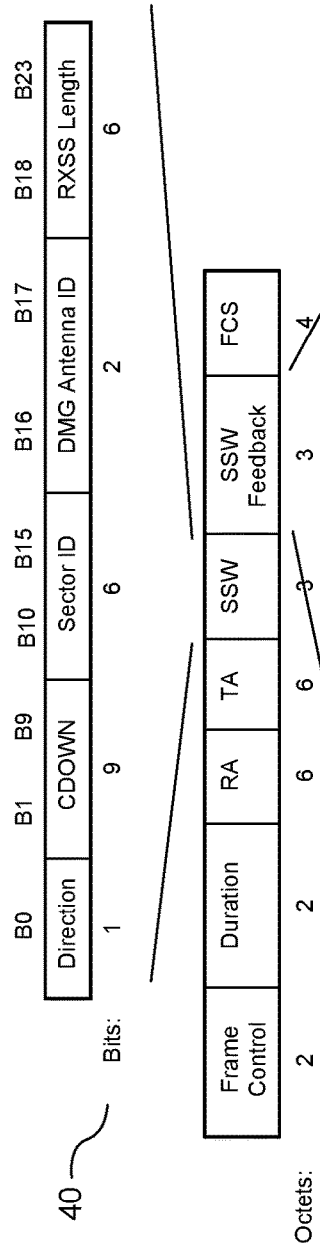
FIG. 4 illustrates example frame formats for Sector Sweep (SSW) and Sector Sweep-Feedback (SSW-Feedback) frames that may be used under certain Wi-Fi protocols.
Figure 4:
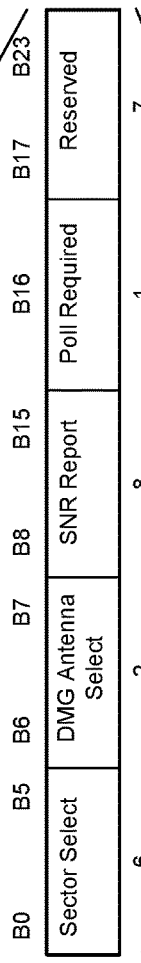

Beamforming performed during the A-BFT 24 period of the beacon interval under various Wi-Fi protocols is further sub-divided into the intervals described below. Referring to FIG. 3, there is shown an example timing diagram illustrating the signaling that occurs during an A-BFT period. The A-BFT is sub-divided into multiple SSW slots (SSW slot #0 30, to SSW slot # A-BFT Length-1 32, in FIG. 3), each of which can be selected by a single STA for performing Responder Sector Sweep (RSS) with the PCP/AP. The RSS is performed by the STA sending SSW frames to the PCP/AP, and the PCP/AP replying with an SSW-Feedback frame back to the STA. FIG. 4 illustrates example frame formats for both an SSW frame 40, and an SSW-Feedback frame 42, that may be used under certain Wi-Fi protocols.

Typically, one or more SSW frames 34 are sent within an SSW slot period separated by short beamforming inter-frame space (SBIFS) 36. Each SSW frame 36 corresponds to a sector of the STA's antenna radiation direction. Referring back to FIG. 1, for example, the STA can set the Sector ID and the DMG Antenna ID fields for each SSW frame to a value that uniquely identifies a specific sector. The PCP/AP receives each SSW frame using a quasi-omni antenna pattern, and determines the Sector ID and DMG Antenna ID field having the best quality. The PCP/AP then sends an SSW-Feedback frame 38 back to the STA with this information, following a medium beamforming inter-frame space (MBIFS) 44 period after the last SSW frame within the same SSW slot. The STA can then select the Sector ID and the DMG Antenna ID having the best quality for future transmissions.

Figure 5:
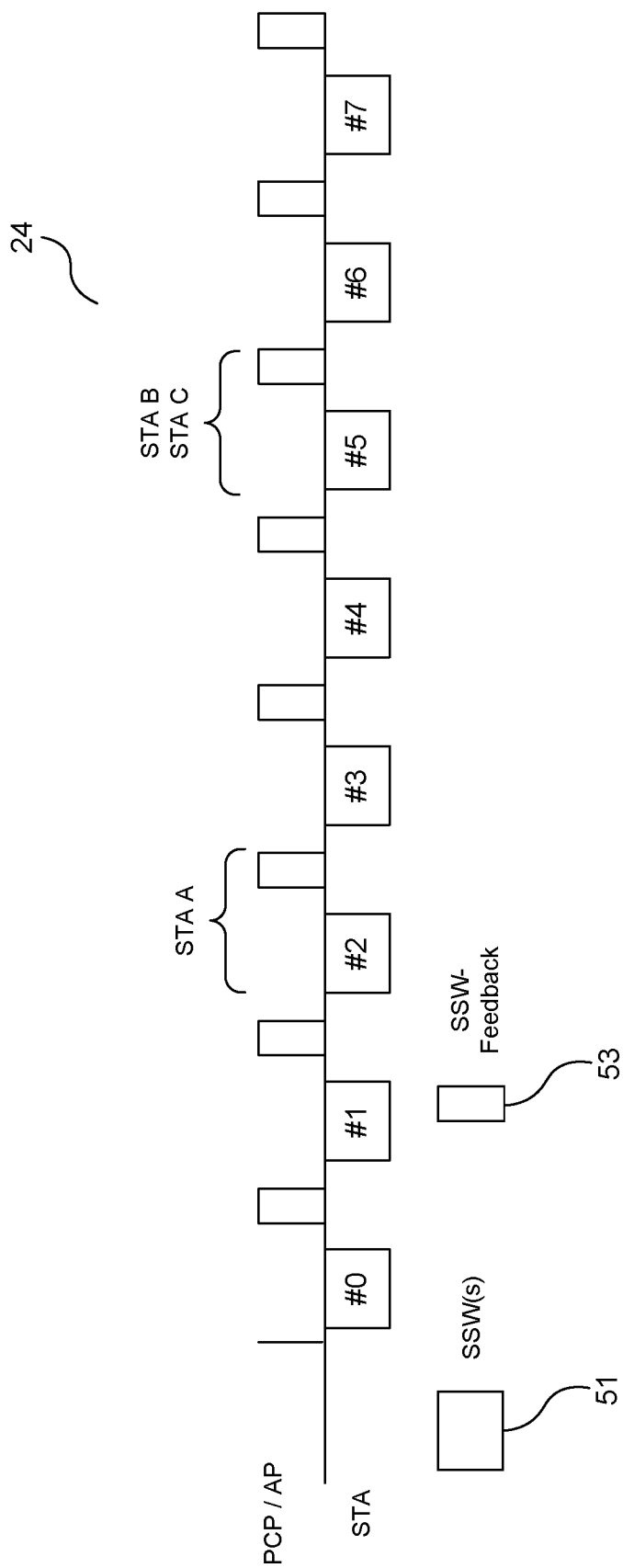
FIG. 5 illustrates an example of an Association Beamforming Training (A-BFT) procedure between three STAs in an A-BFT period.

However, when multiple STAs wish to perform RSS during an A-BFT, the possibility of two or more STAs selecting the same SSW slot arises, resulting in the potential for SSW slot collisions. This is illustrated in FIG. 5, which illustrates an example timing diagram of an A-BFT 24 period comprising 8 SSW slots (Slot #0-7). The A-BFT 24 begins through a random backoff procedure. STAs may select SSW slots 51 from a uniform distribution ([0, A-BFT Length-1]). For example, three DMG STAs (STA A, STA B, STA C) receive DMG Beacon frames from a PCP/AP including Beacon Interval Control field ("isResponder-TXSS=1", "A-BFT Length=8" and "FSS=8"). The three STAs then compete for access by randomly selecting SSW slots (within [0, 7]), where each SSW slot allows for transmission of 8 SSW frames. Because STA A is the only device to choose SSW slot #2, there is no collision in that slot. However, because STA B and STA C both choose SSW slot #5, there is a resulting collision in that slot.

SSW slot collisions cause the erroneous reception of collided SSW frames sent from STAs to the PCP/AP. Under certain Wi-Fi protocols, the PCP/AP responds with an SSW-Feedback frame 53 before the end of each SSW slot (buffered by an MBIFS interval). The STA will have its receiving antenna array configured to a quasi-omni antenna pattern to receive the SSW-Feedback from the PCP/AP. The SSW-Feedback frame is transmitted through the sector identified by the received value of the Sector Select field and DMG Antenna Select field included in the SSW frames sent by the STA in the SSW slot, and contains information based on the SSW frames received within the same SSW slot. Accordingly, if two or more STAs select the same SSW slot (such as STA B and STA C both selecting slot #5 in FIG. 3, for example), the STAs may not correctly detect the SSW-Feedback sent from the PCP/AP.

Figure 6:
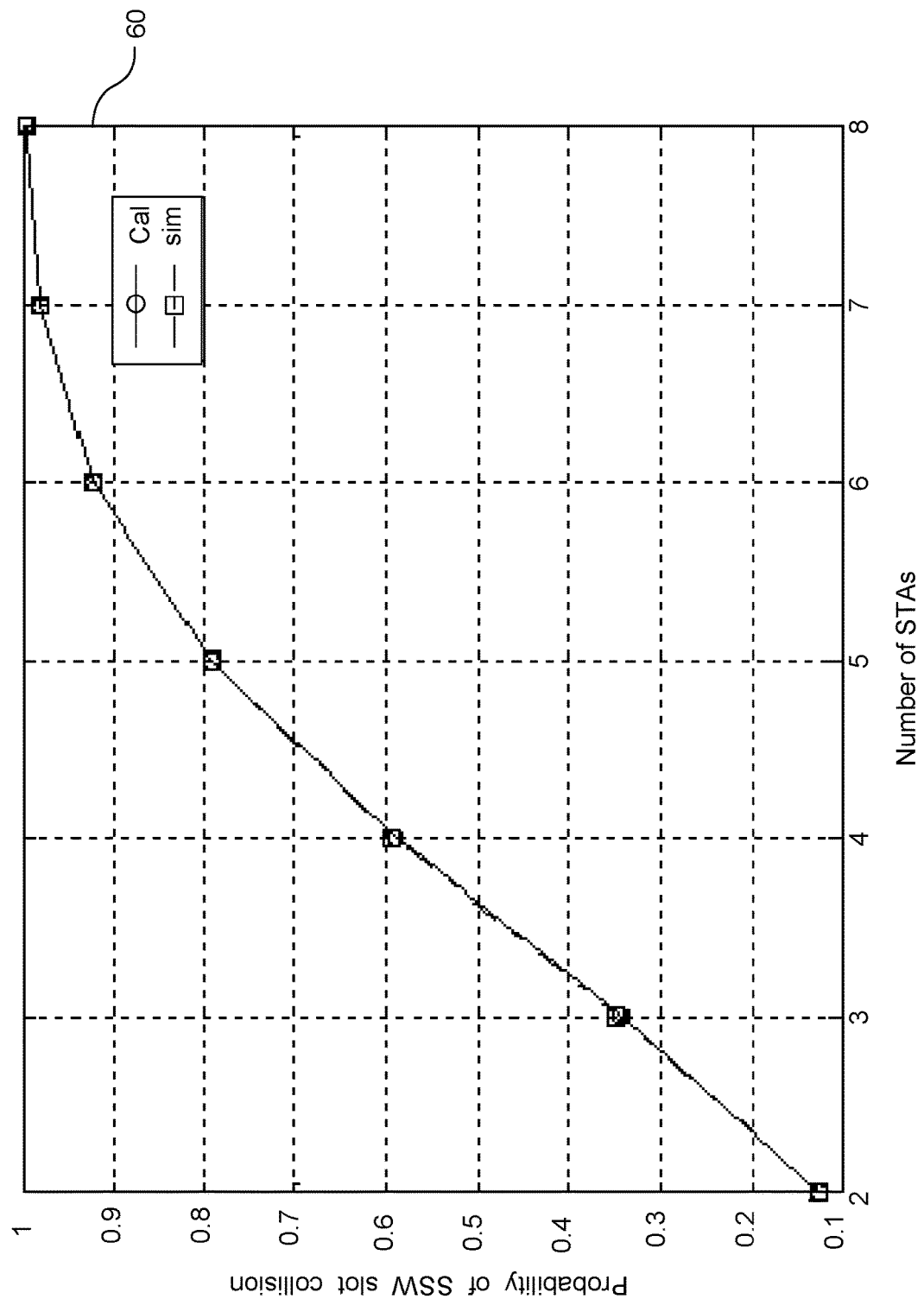
FIG. 6 is an example graph illustrating the probability of SSW slot collisions vs. the number of STAs when performing RSS with a PCP/AP with an assumption of eight SSW slots allocated in A-BFT.

FIG. 6 is an example graph 60 illustrating the probability of SSW slot collisions vs. the number of STAs when performing RSS with a PCP/AP. In this example, there is a maximum 8 SSW slots during the A-BFT. Because DMG basic service sets (BSS) operate on a single channel, multiple STAs that have received Beacon frames must contend with each other to acquire SSW slots within the A-BFT period to perform RSS. As shown in FIG. 6, the likelihood of SSW slot collisions increases with the number of STAs competing for channel access to perform RSS with the PCP/AP.

For example, based on the random backoff procedures for A-BFT according to 802.11ad, the probability of SSW slot collision as shown in FIG. 6 can be calculated as:

$$p = 1 - \frac{\binom{L-1}{m-1} \cdot (m-1)}{L^{(m-1)}}$$

where L is the number of SSW slots in a A-BFT, and m is the number of STAs that are competing for channel access.

Accordingly, an object of the present disclosure is to reduce the probability of SSW slot collisions, for example, when there are multiple STAs competing for channel access during an A-BFT period when performing RSS with a PCP/AP. This may be accomplished through an orthogonal transmission scheme for SSW and SSW-Feedback frames sent between a PCP/AP and different STAs. Transmission schemes are considered orthogonal when a receiver can distinguish and selectively filter or cancel undesired signals from a transmission using a specified basis function. As will be discussed in further detail below, orthogonality may be achieved in time (for example, when frames are transmitted sequentially in non-overlapping fashion), through use of different communication channels, through modulation techniques (waveform), through coding schemes (e.g. through code/symbol spreading sequences), or a combination of the above. In this way, SSW and SSW-Feedback frames can be selectively transmitted between a PCP/AP and multiple STAs using a given set of resources, while reducing or avoiding the probability of SSW slot collisions.

Figure 7A:
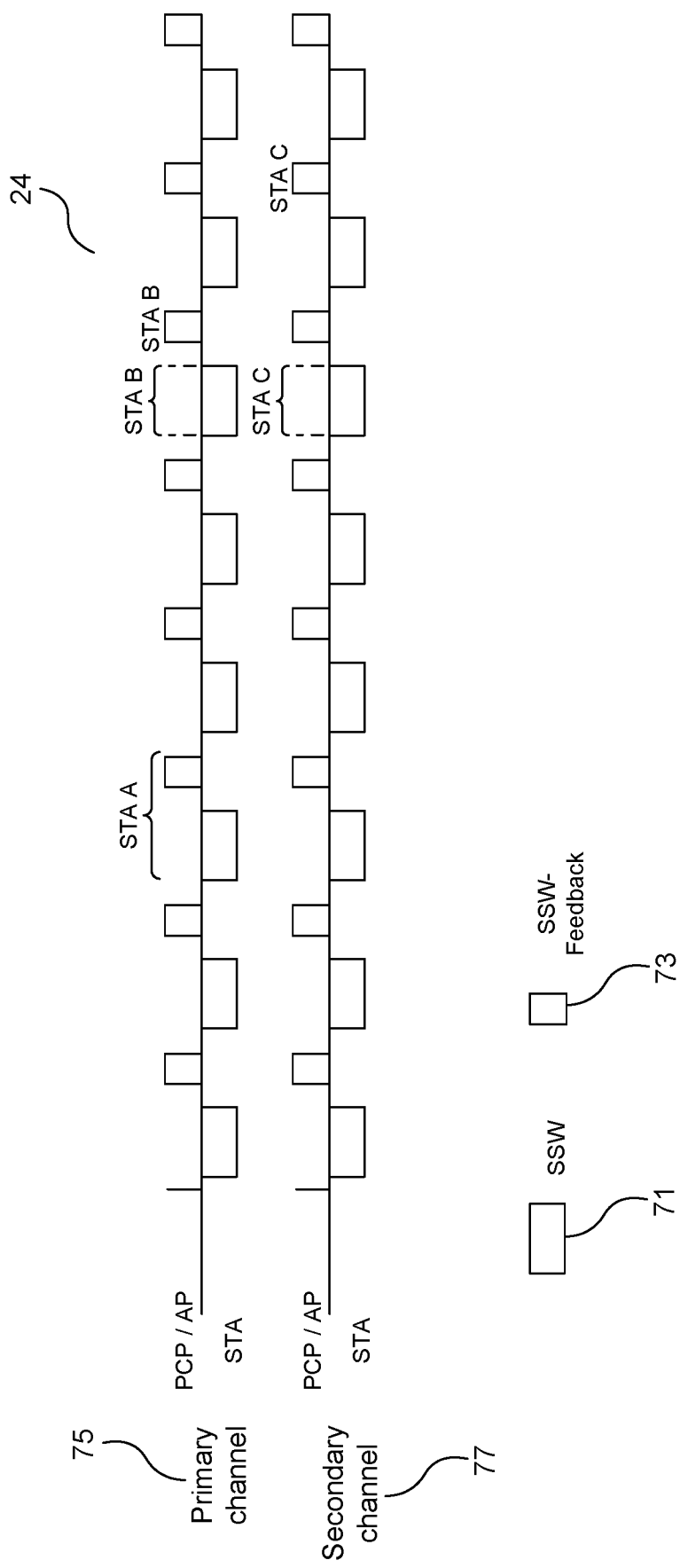
FIGS. 7A and 7B illustrate A-BFT procedures between three STAs performed over two channels, according to embodiments of the present invention.
Figure 7B:
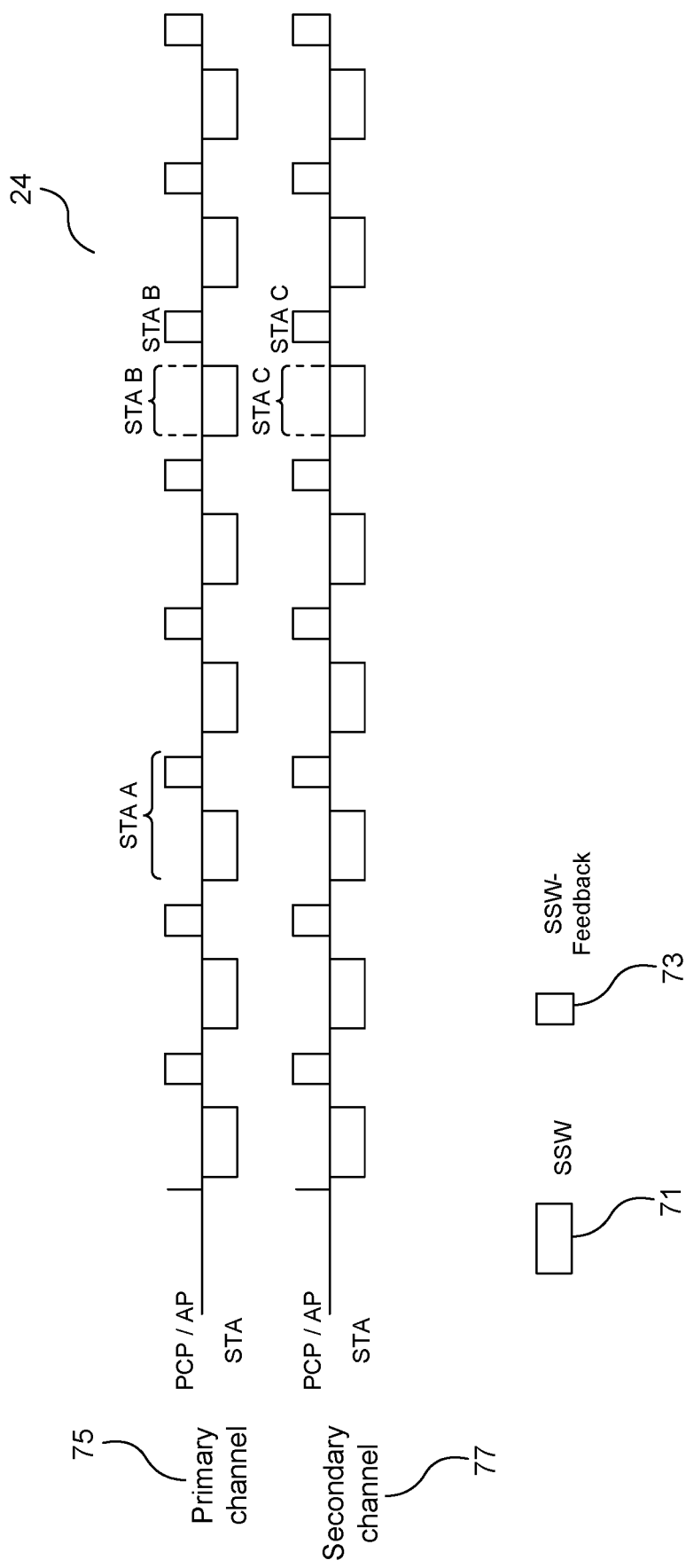

FIGS. 7A and 7B each show an A-BFT 24 period illustrating A-BFT operation according to embodiments of the present invention. Referring to FIG. 7A, the transmissions (i.e. SSW, SSW-Feedback frames 71, 73) during the A-BFT 24 period of FIG. 7A are similar to that of the A-BFT period in FIG. 5, except that the transmissions are performed over a plurality of channels between the STAs and the PCP/AP. For example, in certain Wi-Fi protocols, such as that proposed in future variations of IEEE 802.11, STAs and PCP/APs may be Evolved Directional Multi Gigabit (EDMG) devices that are configured to communicate over multiple channels. EDMG STAs and EDMG PCP/APs may accordingly permit the exchange of SSW frames and SSW-Feedback frames over multiple channels during an A-BFT period.

In certain embodiments comprising EDMG BSS, such as those that may be implemented in future variations of IEEE 802.11 standards, an EDMG PCP/AP and EDMG STAs can exchange SSW frames and SSW Feedback frames over a first (e.g. primary) channel 75 or a second (e.g. secondary) channel 77 (for example having a bandwidth of 2.16 GHz). In contrast, conventional DMG STAs may only perform A-BFT over a single channel. In certain embodiments, the first channel may be indicated by the EDMG PCP/AP in a Beacon. During A-BFT, EDMG devices (for example, those that may support future proposals for IEEE 802.11) may choose to operate on the plural channels rather than being limited to a single channel.

In certain embodiments comprising EDMG BSS, such as those that may be implemented in future variations of IEEE 802.11 standards, an EDMG PCP/AP and EDMG STAs can exchange SSW frames and SSW Feedback frames over a first (e.g. primary) channel or a second (e.g. secondary) channel having a bandwidth of 2.16 GHz. In contrast, conventional DMG STAs may only perform A-BFT over a single channel. In certain embodiments, the first channel may be indicated by the EDMG PCP/AP in a Beacon. During A-BFT, EDMG devices (for example, those that may support future proposals for IEEE 802.11) may choose to operate on the plural channels rather than being limited to a single channel.

In certain embodiments, that may follow future proposals for the IEEE 802.11 standard for example, the random backoff procedure may comprise an EDMG STA selecting a SSW slot # from a uniform distribution (e.g. [0, L] where L is an integer equal to or less than A-BFT Length-1). The EDMG STA can also randomly select one of the available channels.

In certain embodiments, that may follow future proposals for the IEEE 802.11 standard for example, the EDMG PCP/AP can send a corresponding SSW-Feedback frame to an EDMG STA within the same SSW slot, or in the next available SSW slot. In some embodiments, the next available SSW slot may only include the SSW Feedback frame.

In certain embodiments, if the PCP/AP receives at least one SSW frame from a STA, but is unable to transmit an SSW-Feedback frame to that STA within the same A-BFT, the PCP/AP may schedule a later time during DTI for the STA to complete RSS, or may transmit the SSW-Feedback frame during the next available A-BFT period.

Referring back to FIG. 7A, an embodiment of A-BFT operation between three STAs (STA A, STA B, STA C) and a PCP/AP will now be described. The PCP/AP can announce the number of SSW slots and the number of SSW frames in each SSW slot in the A-BFT period, for example, in an A-BFT Length subfield (3-bit) and/or FSS subfield (4-bit) of the Beacon Interval Control field in DMG Beacon, over a first (primary) and a second (secondary) channel. Using a random backoff procedure, STAs then randomly choose a slot and a channel. As shown, STA A chooses SSW slot #2 of the first channel, and STA B and STA C both choose slot #5, on the first and second channels respectively. Although the concurrent selection of slot #5 by STA B and STA C would normally result in an SSW slot collision, random channel selection allows them to perform RSS over separate channels, resulting in an orthogonal transmission scheme for distinguishing SSW/SSW-Feedback frames from/to STA B and STA C to thereby avoid/reduce any collision. As shown in FIG. 7A, the PCP/AP simultaneously receives SSW frames from STA B and STA C over the first and second channels, and decodes them accordingly. The PCP/AP then sends the corresponding SSW-Feedback frame to STA B over the first channel in the same SSW slot (slot #5), and subsequently sends the corresponding SSW-Feedback for STA C over the second channel in the next available SSW slot (#6), such that the respective SSW-Feedback frame transmissions are further orthogonal in time.

Referring to FIG. 7B, there is shown another embodiment of an A-BFT operation between three STAs (STA A, STA B, STA C) and a PCP/AP similar to that shown in FIG. 7A, except in that the PCP/AP alternatively sends SSW-Feedback frames to STA B and STA C in the same SSW slot (slot #5). However, because the SSW-Feedback frames for STA B and STA C are still transmitted over different channels (e.g. an orthogonal transmission scheme through channel variation), they remain distinguishable by the STAs and their coincidence in the same SSW slot (slot #5) does not result in a collision. This may be performed even in situations where STA B and STA C are adjacent or co-located in space or where STA B and STA C are covered by the best respective PCP/AP Tx antenna sectors and the PCP/AP has multi-antenna capability to transmit SSW-Feedback frames simultaneously through multiple antennas.

Figure 8:
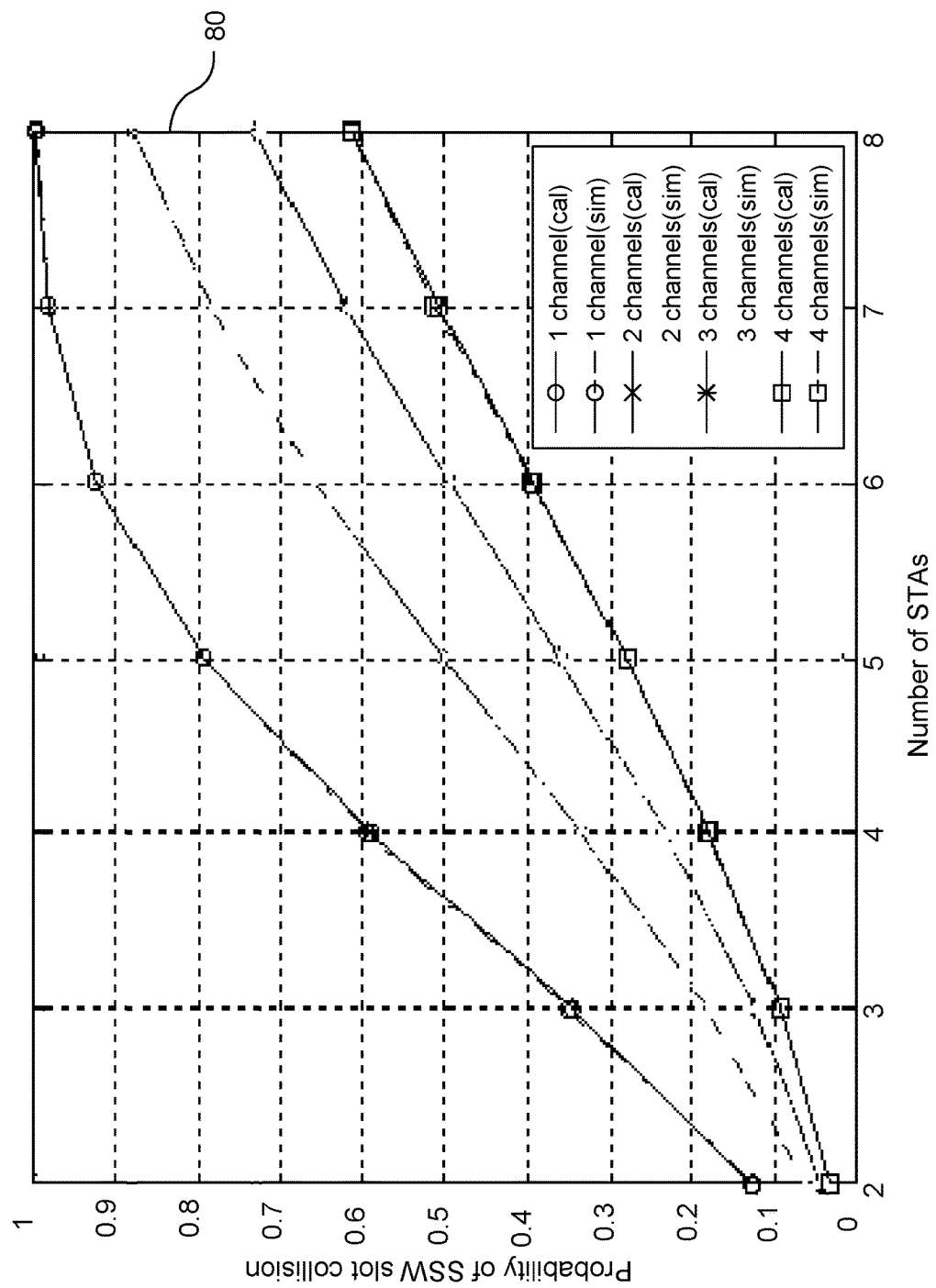
FIG. 8 is an example graph illustrating the probability of SSW slot collisions vs. the number of STAs when performed over different numbers of channels with an assumption of eight SSW slots allocated in A-BFT, according to embodiments of the present invention.

FIG. 8 is a graph 80 illustrating the probability of SSW slot collisions vs. the number of STAs when performing RSS using the A-BFT procedure illustrated in FIG. 7A above, according to embodiments of the present invention. In FIG. 8, the solid lines represent the calculated (cal) probabilities, and the dashed lines represent the simulated (sim) probabilities for A-BFT performed over 1, 2, 3, and 4 available channels. As clearly indicated, the probability of SSW slot collisions is greatly reduced as the number of available channels increases.

Figure 9:
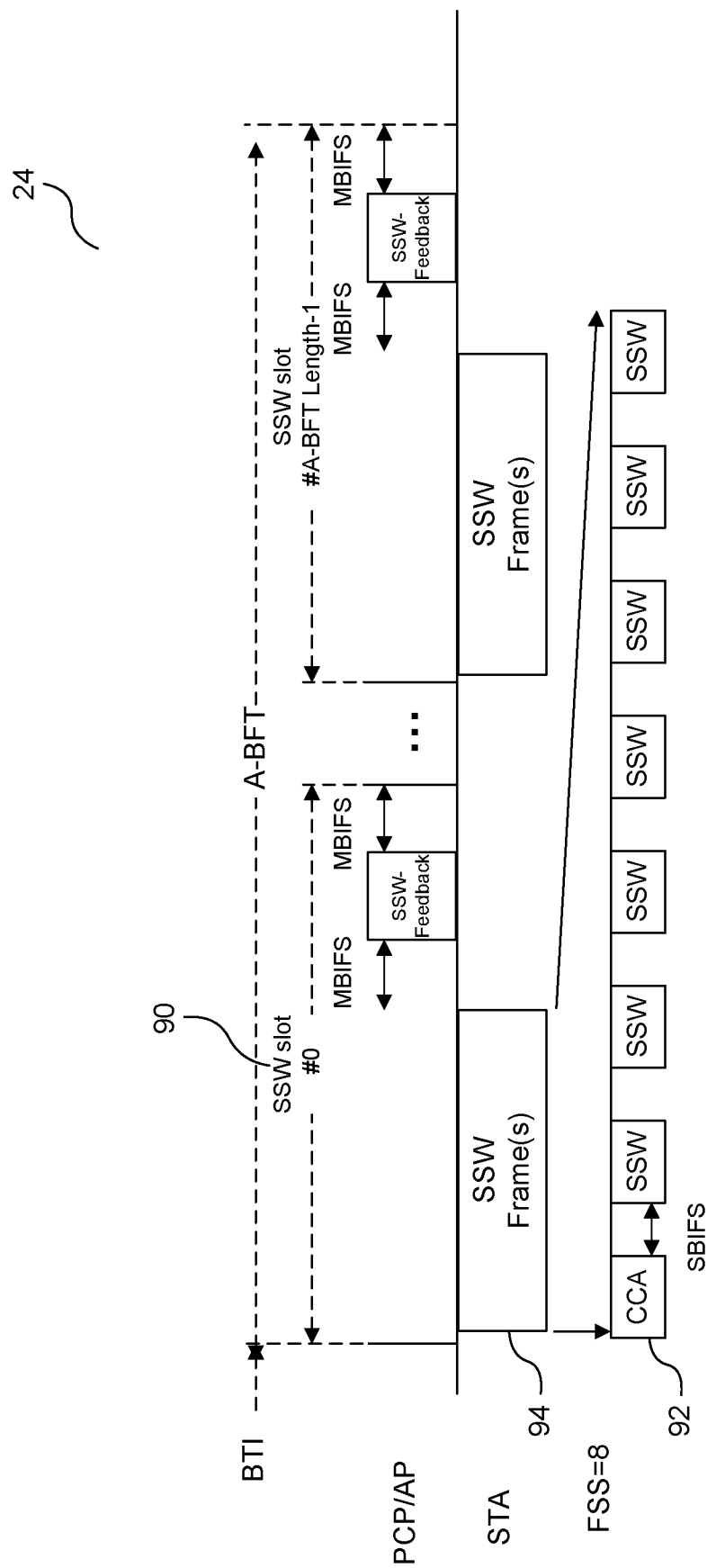
FIG. 9 illustrates an A-BFT procedure comprising a clear channel assessment (CCA) function, according to embodiments of the present invention.

FIG. 9 is an A-BFT period 24 illustrating A-BFT operation according to embodiments of the present invention. The A-BFT shown in FIG. 9 is similar to the A-BFT in FIG. 3, except that an EDMG STA performs a clear channel assessment (CCA) function 92 at the first SSW frame 94 of an SSW slot 90 when the backoff count equals zero. This reduces the probability of transmission collision between DMG STAs and EDMG STAs, and may mitigate interference among overlapped BSSs. An EDMG STA can perform a carrier sensing (CS) function (as part of the CCA function) to determine a medium condition for a SSW slot. If the SSW slot is busy, the EDMG STA does not transmit SSW frames during that SSW slot. The EDMG STA may then restart another random backoff procedure to randomly choose another SSW slot from the remaining SSW slots in the same beacon interval and randomly choose a channel. If the CS function indicates a medium idle condition for the other SSW slot, the EDMG STA can transmit SSW frames (up to a maximum of FSS−1 total frames) in that other SSW slot.

In certain embodiments, the ability for the EDMG STA to perform the CCA function during the first SSW frame period, is facilitated by the SSW frame duration and the CCA detection time. For example, the SSW frame duration may be 14.9 μS, which is longer than the total CCA detection time (3 μS for Control PHY) and MBIFS (9 μS). The CCA function for the SSW slot medium condition when backoff count equals zero may operate on either the first channel, second channel, or both.

In contrast, in the IEEE 802.11ad protocol, the responder (STA) decrements the backoff count by one at the end of each SSW slot, even if the CS function at the responder indicates a medium busy condition the SSW slot. The responder can only initiate RSS at the start of the SSW slot when the backoff count is 0 at the beginning of the SSW slot.

FIGS. 10A and 10B illustrate Sector Sweep Feedback field formats 100, 105 that may be used for SSW and SSW-Feedback frames, according to embodiments of the present invention. For example, these Sector Sweep Feedback field formats may be implemented for transmitting SSW frames over a plurality of channels to perform channel-dependent RSS in various embodiments. As shown, the Sector Sweep Feedback field formats each contain a Channel Select subfield which may be used to indicate selected channels for particular sectors.

For example, during A-BFT, an EDMG STA can use the above Sector Sweep Feedback fields to provide certain information to the PCP/AP in an SSW frame; this includes using the Selector Select, DMG Antenna Select, and Channel Select subfields to provide corresponding information. A PCP/AP can similarly also use the Sector Sweep Feedback fields above, including Selector Select, DMG Antenna Select, and Channel Select subfields, to provide corresponding information to an STA in an SSW-Feedback frame.

In some embodiments, SSW/SSW-Feedback frame structures may include a 7 bit reserved field, where some or all of the bits may be allocated to a Channel Select subfield to indicate a selected channel for a particular sector. In the embodiment of FIG. 10A, 2 bits are allocated for the Channel Select subfield 102, which allows for the selection of up to 4 channels to meet current channelization protocols in the 60 GHz band. In the embodiment of FIG. 10B, 3 bits are allocated for the Channel Select subfield 107, to allow for the selection of up to 8 channels to accommodate future channelization protocols in the 60 GHz band or other bands.

Figure 11:
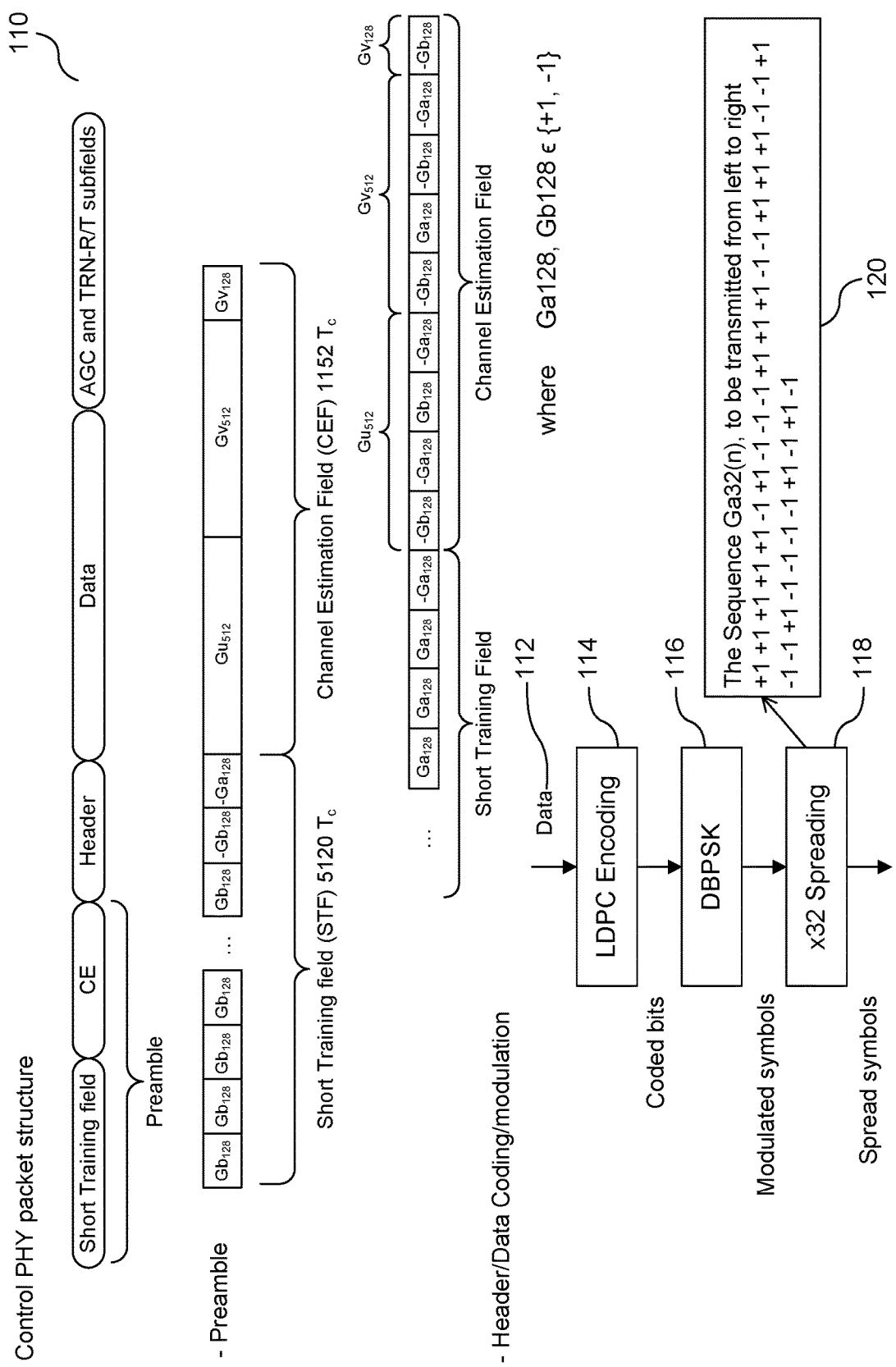
FIG. 11 illustrates a directional multi gigabit (DMG) modulation and coding scheme (MCS) that may be used to orthogonalize SSW/SSW-Feedback frames, according to embodiments of the present invention.

FIG. 11 illustrates a DMG modulation and coding scheme (MCS) using MCS0 110, which may be used to orthogonalize SSW or SSW-Feedback frames in embodiments of A-BFT operation, as will be discussed in further detail below. Using MCS0, the Short Training Field (STF), Channel Estimation Field (CEF), Header, and Data portions of the Control PHY packet are BPSK modulated. As shown in FIG. 11, the Header and Data portions 112 undergo Low Density Parity Check (LDPC) 114 encoding into coded bits, which are then processed using a Differential Binary Phase Shift Keying (DBPSK) function 116 to provide modulated symbols. The modulated symbols are then processed using an x32 Spreading function 118 to apply a spreading sequence producing spread symbols. For example, if adhering to IEEE 802.11ad protocol, the spreading sequence may be a 32 bit Golay sequence 120, such as that shown in FIG. 11 (Ga32 (n)=+1+1+1+1+1−1+1−1−1−1+1+1+1−1−1+1+1+1−1−1+ 1−1−1+1−1−1−1−1+1−1+1−1, transmitted from left to right). In embodiments involving multiple STAs communicating with a PCP/AP (as will be discussed in further detail below), SSW/SSW-Feedback frames may be uniquely modulated according to each STA using different spreading sequences, such that each SSW/SSW-Feedback frame is orthogonal to reduce the incidence of collisions. In some embodiments, SSW and/or SSW-Feedback frames may be transmitted using this procedure, and other MCS schemes may alternatively be utilized.

In some embodiments, SSW frames may be Evolved Sector Sweep (E-SSW) frames that can be transmitted by EDMG devices. E-SSW frames have a structure similar to the Control PHY packet structure in FIG. 11, except that the STF, Channel Estimation Field (CEF), Header, and Data fields are modulated under IEEE 802.11ad SSW Physical Layer Convergence Protocol (PLCP) Protocol Data Unit (collectively, "PPDU"), which orthogonalizes the E-SSW frame with respect to SSW frames to permit simultaneous transmission of E-SSW and SSW frames on a single channel without SSW slot collisions.

FIGS. 12A and 12B illustrate 128 bit Golay sequences 122, 124 which may be used to form the STF of an E-SSW frame, in some embodiments of the present invention. Golay sequences may be chosen for the STF and CEF parameters to meet a desired correlation and/or to render E-SSW frames orthogonal.

The 128 bit Golay sequences 122, 124 in FIGS. 12A and 12B have a zero-correlation zone (ZCZ) property with Ga128 and Gb128, respectively, as specified in the IEEE 802.11ad standard. In some embodiments, other suitable sequences, including different Golay sequences also having ZCZ, may alternatively be used.

In some embodiments, the CEF-SC (Single Carrier) field of an E-SSW frame also have ZCZ property with corresponding CEF-SC field in the IEEE 802.11ad standard.

In some embodiments, that may follow future proposals for IEEE 802.11 standards for example, an Evolved-MCS0 (E-MCS0) scheme may be used by phase-rotating all Binary Phase Shift Keying (BPSK) symbols in the Header and Data fields by π/2 (i.e., Quadrature BPSK modulation). The error rate performance in E-MCS0 should be equivalent to that under MCS0. Because QBPSK and BPSK are orthogonal in signal space, the adoption of E-MCS0 allows an E-SSW frame (using E-MCS0) to be simultaneously transmitted with an SSW frame (using MCS0) within the same SSW slot on the same channel.

In some embodiments, that may follow future proposals for IEEE 802.11 standards for example, the PCP/AP may have its antenna configured in a quasi-omni antenna pattern to simultaneously detect and decode both SSW and E-SSW frames over a single channel.

Figure 13A:
FIG. 13A illustrates an A-BFT procedure between three STAs transmitting SSW and E-SSW frames over a single channel, wherein an SSW-Feedback frame, and SSW-Feedback frame corresponding to the E-SSW frame, are sent to respective STAs in different SSW slots, according to an embodiment of the present invention.
Figure 13B:
FIG. 13B illustrates an A-BFT procedure between three STAs transmitting SSW and E-SSW frames over a single channel, wherein an SSW-Feedback frame and E-SSW-Feedback frame are sent to respective STAs in the same SSW slot, according to an embodiment of the present invention.

FIGS. 13A and 13B illustrate embodiments of A-BFT operation between three STAs (STA A, STA B, STA C) and a PCP/AP, operating over a single channel.

As shown in the embodiment of FIG. 13A, STA A and STA B transmit SSW frames, and STA C transmits an E-SSW frame, all over a single channel. Using a random backoff procedure, STA A chooses SSW slot #2, and STA B and STA C both contend for SSW slot #5. However, because STA B sends SSW frames 132, and STA C transmits orthogonal E-SSW frames 136, the frames do not collide and the PCP/AP is able to correctly detect/decode these frames. The PCP/AP then responds to STA B with a corresponding SSW-Feedback frame 134 in the same SSW slot (slot #5), and then responds to STA C in the next available SSW slot (slot #6) with an SSW-Feedback frame corresponding to the received E-SSW frame, such that these frame transmissions are further orthogonal in time.

Referring to FIG. 13B, there is shown another embodiment of an A-BFT operation between three STAs (STA A, STA B, STA C) and a PCP/AP similar to that of FIG. 13A above, except in that the PCP/AP alternatively determines and sends an SSW-Feedback frame (to STA B), and an E-SSW-Feedback frame 138 (corresponding to the received E-SSW frame, to STA C) within the same SSW slot 132 (slot #5) and over the same channel. Because the E-SSW-Feedback frame 138 is orthogonal to the SSW-Feedback frame 134, they may be simultaneously transmitted within the same SSW slot 132 (slot #5 for example) and over the same channel, without colliding. STA B and STA C may then selectively receive and decode respective SSW-Feedback, and E-SSW-Feedback frames accordingly. This may be performed even in situations where STA B and STA C are adjacent or co-located in space or where STA B and STA C are covered by the respective best PCP/AP Tx antenna sectors and the PCP/AP has multi-antenna capability to transmit SSW-Feedback frames simultaneously through multiple antennas.

Figure 13C:
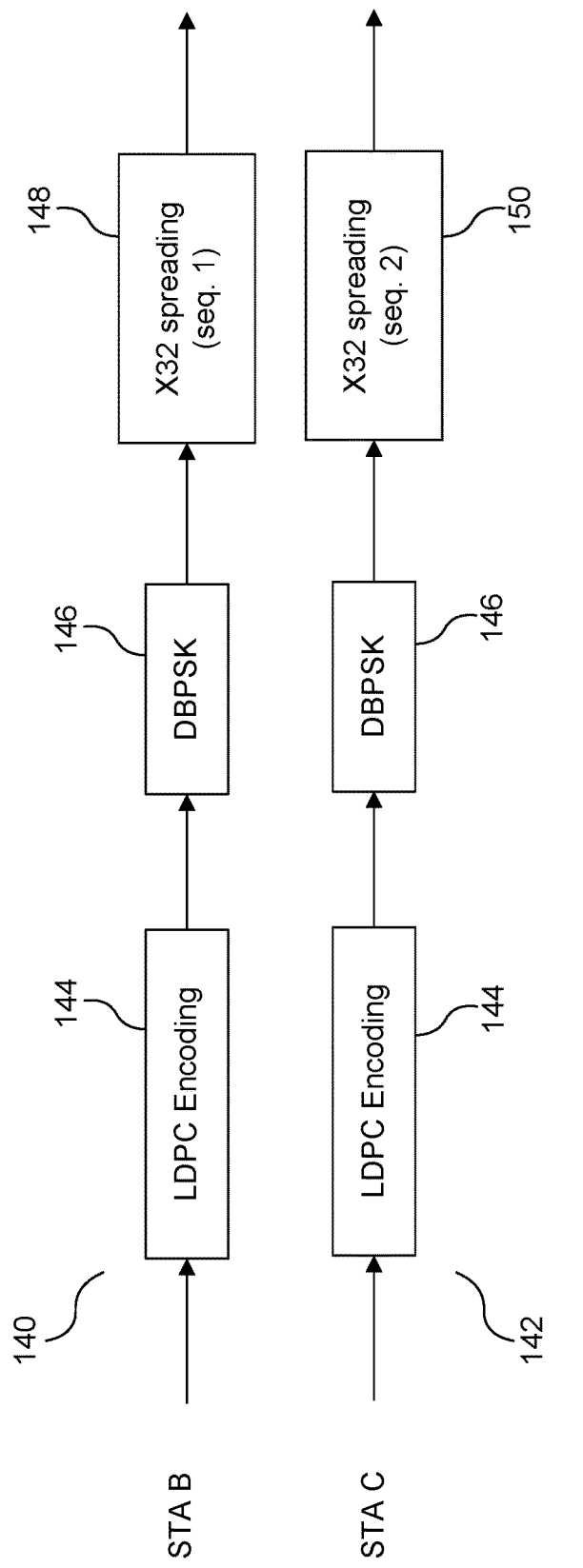
FIG. 13C illustrates functional chain diagrams of directional multi gigabit (DMG) modulation and coding schemes (MCS) applying different spreading sequences, that may be used to orthogonalize SSW/SSW-Feedback frames, according to an embodiment of the present invention.

In some embodiments, SSW/SSW-Feedback frames 132, 134 may be orthogonalized through application of different spreading sequences. This may help reduce or prevent the incidence of SSW/SSW-Feedback frame collisions in situations where there are multiple STAs communicating with a PCP/AP. Referring to FIG. 13C, there are shown functional chain diagrams of DMG modulation and coding schemes (MCS) including a spreading sequence function, which may be used to orthogonalize respective SSW frames transmitted from different STAs in A-BFT operation. For example, the upper chain 140 may be used for SSW frames transmitted by STA B, and the lower chain 142 may be used for SSW frames transmitted by STA C. In this way, SSW frames may be transmitted by each of STA B and STA C simultaneously (e.g. in the same SSW slot) and using the same resources (e.g. over the same channel) while still remaining distinguishable by the PCP/AP.

Figure 16A:
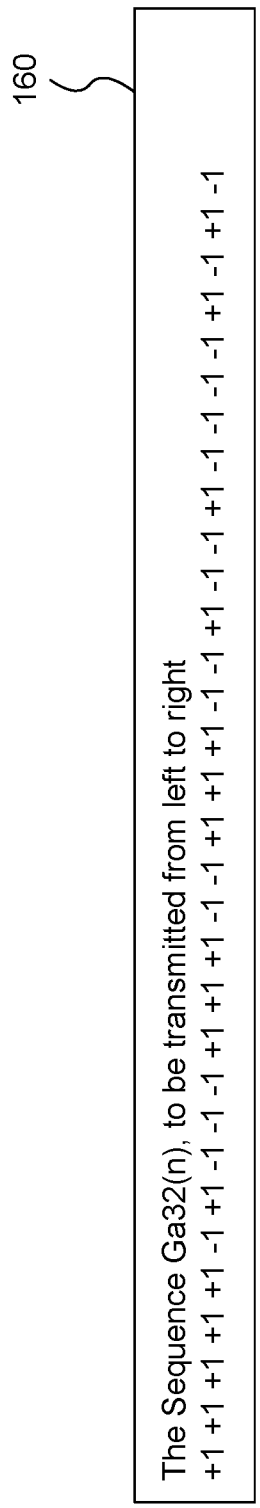
FIGS. 16A and 16B are 32 bit Golay sequences which may be used as first and second spreading sequences (Ga32(n) and Gb32(n)) chosen to have sufficient cross-correlation properties, such that the resulting symbols from the upper and lower chains are orthogonalized with respect to one another, according to embodiments of the present invention.
Figure 16B:
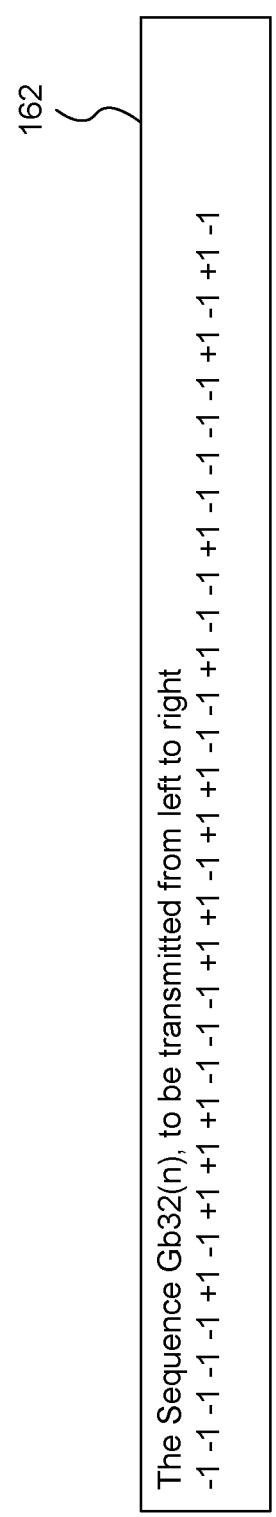
Figure 16C:
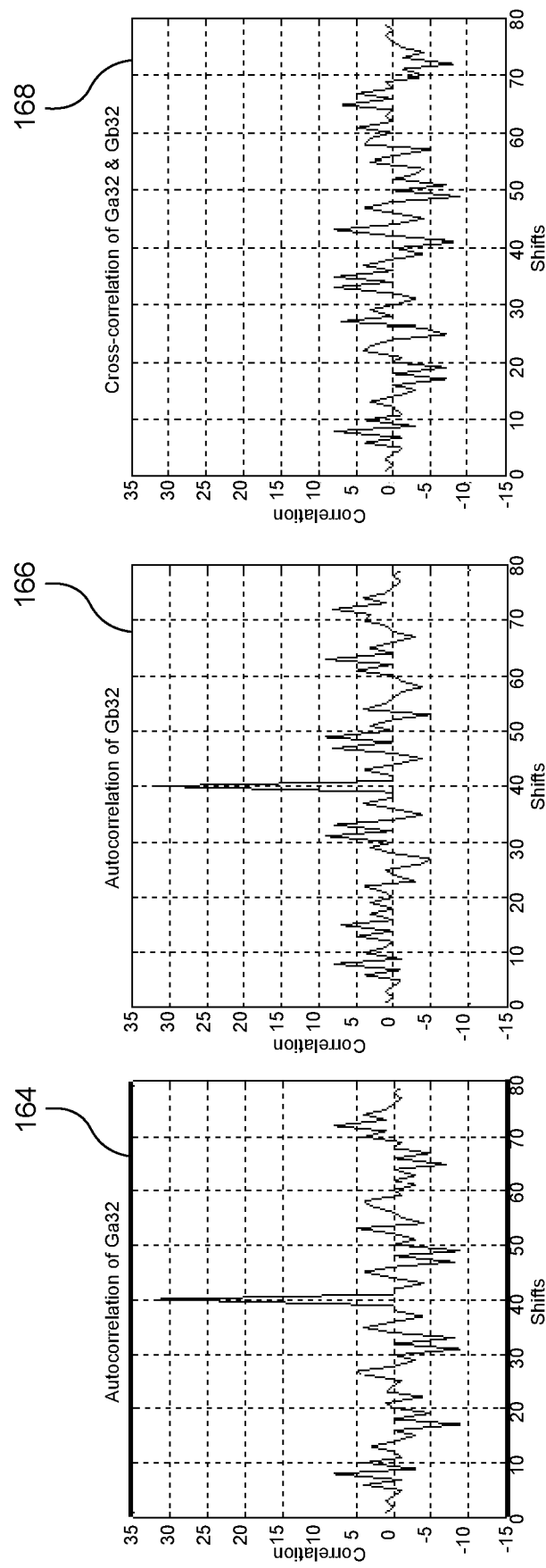
FIG. 16C is an example graph illustrating the correlation properties between Ga32(n) and Gb32(n) spreading sequences, as shown in FIGS. 16A-16B.

Still referring to FIG. 13C, the upper chain includes a Low Density Parity Check (LDPC) function 144 for encoding into coded bits, a Differential Binary Phase Shift Keying (DBPSK) function 146 to transform the coded bits to modulated symbols, and a 32-time Spreading function 148 applying a first spreading sequence, to convert the modulated symbols into spreaded symbols. Similarly, the lower chain 142 also includes an LDPC function 144, a DBPSK function 146, and an x32 Spreading function 150 applying a second spreading sequence. The first and second spreading sequences 148, 150 are selectively chosen to have sufficient cross-correlation properties, such that the resulting symbols from the upper and lower chains 140, 142 are orthogonalized with respect to one another. As an example, the first spreading sequence 160 may be the 32 bit Golay sequence shown in FIG. 16A (Ga32(n)=+1+1+1+1+1−1+1−1−1−1+1+1+1−1−1+1+1+1−1−1+1−1−1+1−1−1−1+1−1+1−1, transmitted from left to right), and the second spreading sequence 162 may be the 32 bit Golay sequence shown in FIG. 16B (Gb32(n)=−1−1−1−1+1−1+1+1+1−1−1−1+1+1−1+1+1−1−1+1−1−1+1−1−1+1+1−1+1+1, transmitted from left to right); these spreading sequences are found to cross-correlate to zero at one central point, and may be suitable for DMG devices which adhere to this form of sequencing under IEEE 802.11ad protocol. Correlation properties between the Ga32(n) and Gb32(n) spreading sequences (shown in FIGS. 16A-16B), are illustrated in the graphs 164, 166, 168 on FIG. 16C.

Figure 17C:
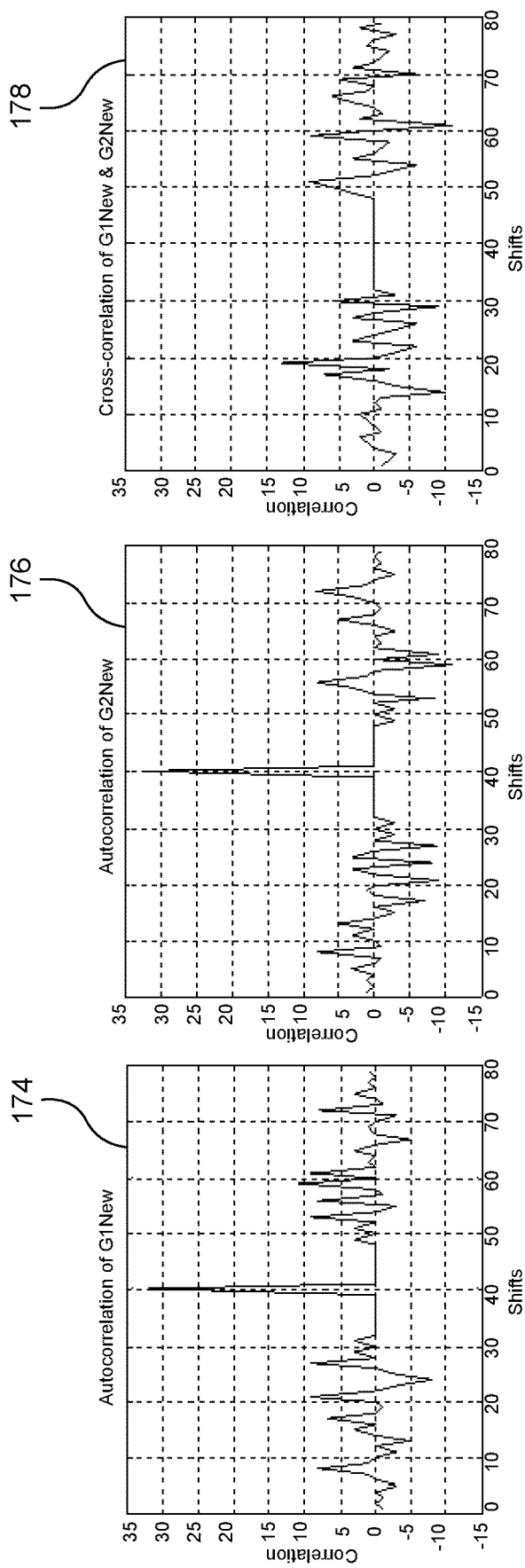
FIG. 17C is an example graph illustrating the correlation properties between G1New(n) and G2New(n) spreading sequences, as shown in FIGS. 17A-17B.

In some embodiments, the first and second spreading sequences may be selected such that they are mutually orthogonal within a zero correlation zone (ZCZ), having the same sequence length. In this case for example, the first spreading sequence 170 may be the 32 bit Golay sequence shown in FIG. 17A (G1New(n)=+1+1+1−1+1+1−1+1−1−1−1−1+1+1+1−1+1+1+1+1−1+1+1+1+1−1−1+1−1−1, to be transmitted from left to right), and the second spreading sequence 172 may be the 32 bit Golay sequence shown in FIG. 17B (G2New(n)=−1+1−1−1−1+1+1+1+1−1+1−1+ 1+1+1−1+1−1−1−1+1+1+1−1+1−1−1+1−1−1−1, to be transmitted from left to right). In some situations, the use of mutually orthogonal spreading sequences within a ZCZ for devices adhering to IEEE 802.11ay and later variations, may provide improved performance. Correlation properties between the G1New(n) and G2New(n) spreading sequences (shown in FIGS. 17A-17B), are illustrated in the graphs 174, 176, 178 on FIG. 17C.

Although the above embodiments illustrate application of two orthogonal spreading sequences between two different STAs, in other embodiments (not shown), any integer N of spreading sequences from a set of orthogonal spreading sequences, may be applied across N different STAs such that their respective SSW frame transmissions are also orthogonal. Further, similar spreading sequences may also be applied to SSW-Feedback, and E-SSW/E-SSW-Feedback frames in certain variations of IEEE 802.11 protocol, as will be further illustrated in the example below with reference to FIG. 13D.

Figure 13D:
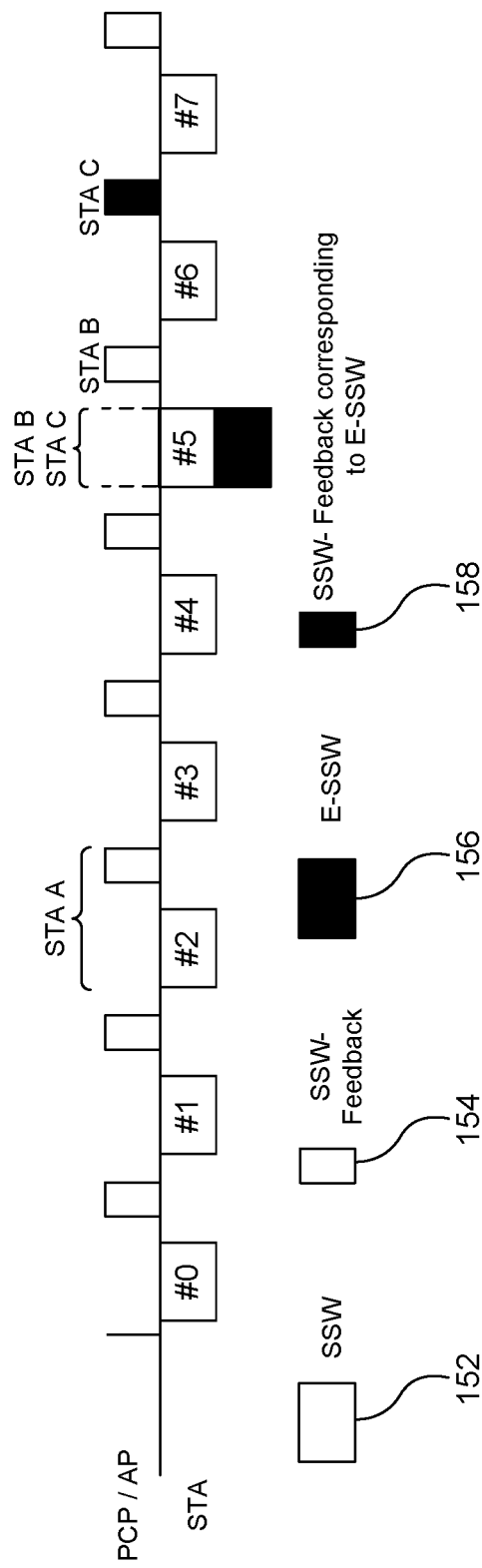
FIG. 13D illustrates an A-BFT procedure between three STAs transmitting SSW and E-SSW frames over a single channel, wherein SSW and E-SSW frames are orthogonalized through selective application of different spreading sequences, according to an embodiment of the present invention.

As shown in FIG. 13D, STA A and STA B transmit SSW frames 152, and STA C transmits an E-SSW frame 156, all over a single channel. Using a random backoff procedure, STA A chooses SSW slot #2, and STA B and STA C both contend for SSW slot #5. However, because STA B sends SSW frames spread using a first spreading sequence, and STA C transmits E-SSW frames spread using a second spreading sequence, wherein the first and second spreading sequences are orthogonalized with respect to one another, the frames do not collide and the PCP/AP is able to uniquely detect/decode these frames.

The PCP/AP then responds to STA B with a corresponding SSW-Feedback frame 154 in the same SSW slot (slot #5), and then responds to STA C in the next available SSW slot (slot #6) with an SSW-Feedback frame corresponding to the received E-SSW frame, such that these feedback frames are orthogonal in time. However, in certain embodiments (not shown), the PCP/AP may also apply the first spreading sequence to the SSW-Feedback frame (intended for STA B), and the second spreading sequence to the SSW-Feedback frame corresponding to the received E-SSW frame (intended for STA C), to render these feedback frames mutually orthogonal, allowing for simultaneous transmission in the same SSW slot over the same channel. STA B and STA C may then selectively receive and decode respective SSW-Feedback, and E-SSW-Feedback frames 158 accordingly. This may be performed even in situations where STA B and STA C are adjacent or co-located in space or where STA B and STA C are covered by the respective best PCP/AP Tx antenna sectors and the PCP/AP has multi-antenna capability to transmit SSW-Feedback frames simultaneously through multiple antennas.

Referring back to FIG. 13C, although it illustrates functional MCS diagrams which may be applied by individual STAs for spreading modulated SSW frames, similar functional MCS diagrams may also be applied by a PCP/AP for spreading modulated SSW-Feedback frames intended for different STAs. For example, a PCP/AP may apply a different spreading sequence to SSW-Feedback frames according to the intended recipient. The spreading sequence may be chosen from a set of predetermined spreading sequences which are mutually orthogonal, such that the resultant transmissions intended for different STAs are orthogonal with respect to one another.

Figure 14A:
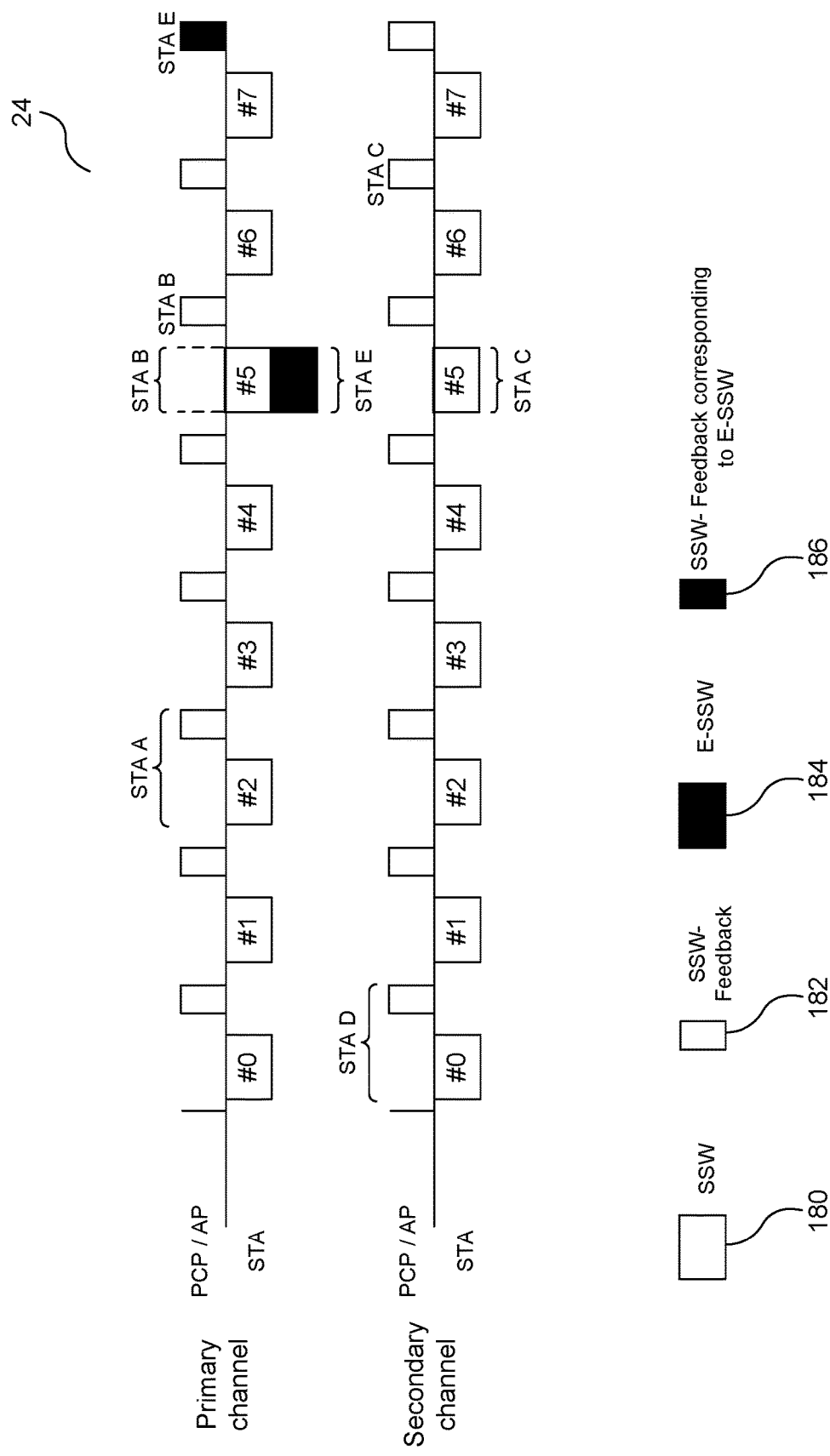
FIG. 14A illustrates an A-BFT procedure between five STAs transmitting SSW and E-SSW frames over two channels, wherein SSW-Feedback and E-SSW-Feedback frames are sent to respective STAs in different SSW slots, according to an embodiment of the present invention.
Figure 14B:
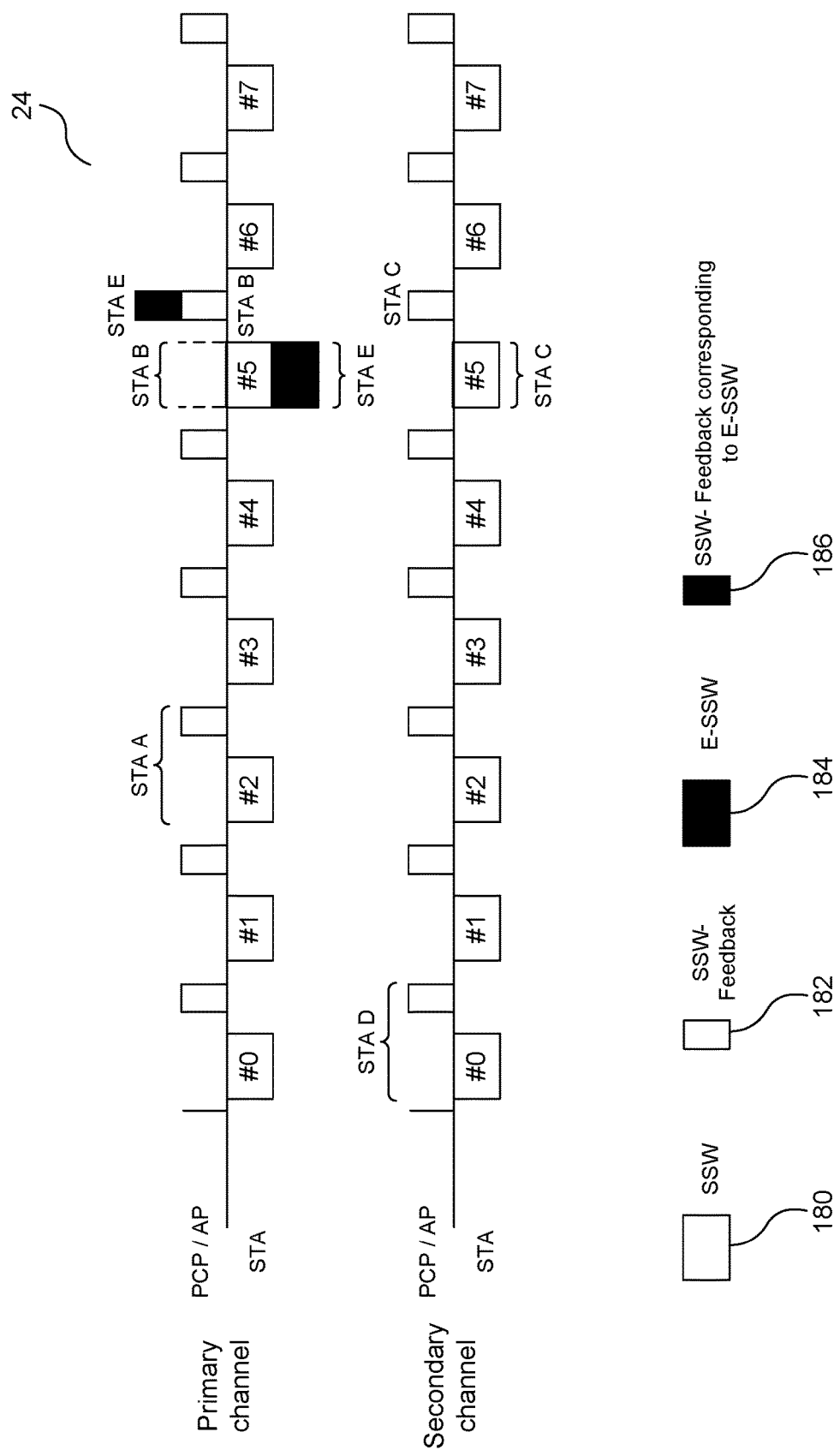
FIG. 14B illustrates an A-BFT procedure between five STAs transmitting SSW and E-SSW frames over two channels, wherein SSW-Feedback and E-SSW-Feedback frames are sent to respective STAs in the same SSW slot, according to an embodiment of the present invention.

FIGS. 14A and 14B illustrate embodiments of A-BFT 24 operation between five STAs (STA A, STA B, STA C, STA D, STA E) and a PCP/AP over a first (primary) and second (secondary) channel. Referring to FIG. 14A, STA A, STA B, STA C, STA D transmit SSW frames, and STA E is an EDMG device which transmits an E-SSW frame 184. The A-BFT period comprises 8 SSW slots (Slots #[0,7]). Using a random backoff procedure, STA A chooses slot #2 on the first channel, STA B chooses slot #5 on the first channel, STA C chooses slot #5 on the second channel, STA D chooses slot #0 on the second channel, and STA E chooses slot #5 on the first channel. Although STA B and STA E both choose slot #5 on the first channel, SSW slot collision is avoided because STA B transmits SSW frames 180, and STA E transmits orthogonal E-SSW frames 184 to the PCP/AP. Further, SSW slot collision is avoided between STA B and STA C (despite both choosing slot #5) because they transmit SSW frames on different channels. The PCP/AP then provides corresponding SSW-Feedback frames 182 to the devices one at a time. SSW-Feedback for STA B is provided within the same SSW slot (slot #5) on the first channel, SSW-Feedback for STA C is provided in the next available SSW slot (slot #6) on the second channel, and E-SSW-Feedback is provided to STA E in the next available SSW slot (slot #7) on the first channel. Referring to FIG. 14B, the PCP/AP may alternatively send the E-SSW-Feedback frame 186 to STA E in the same slot as STA B and STA C (slot #5) without collision, because the E-SSW-Feedback frame for STA E is orthogonal to the SSW-Feedback frame for STA B, and the E-SSW-Feedback frame for STA E is both orthogonal to the SSW-Feedback frame for STA C and on a different channel.

In some embodiments, STAs may be EDMG devices that can use MCS0 to transmit SSW frames, or E-MCS0 to transmit E-SSW frames over any of the first and second channels. The PCP/AP may also be an EDMG device which can simultaneously receive/decode both SSW and E-SSW frames, and is capable of transmitting E-SSW/SSW-Feedback frames over multiple channels in an EDMG BSS.

In some embodiments, that may follow future proposals for IEEE 802.11 standards for example, STAs may be DMG devices that are limited to transmitting SSW frames, and receiving SSW-Feedback frames, over a single channel in EDMG BSS.

Figure 15:
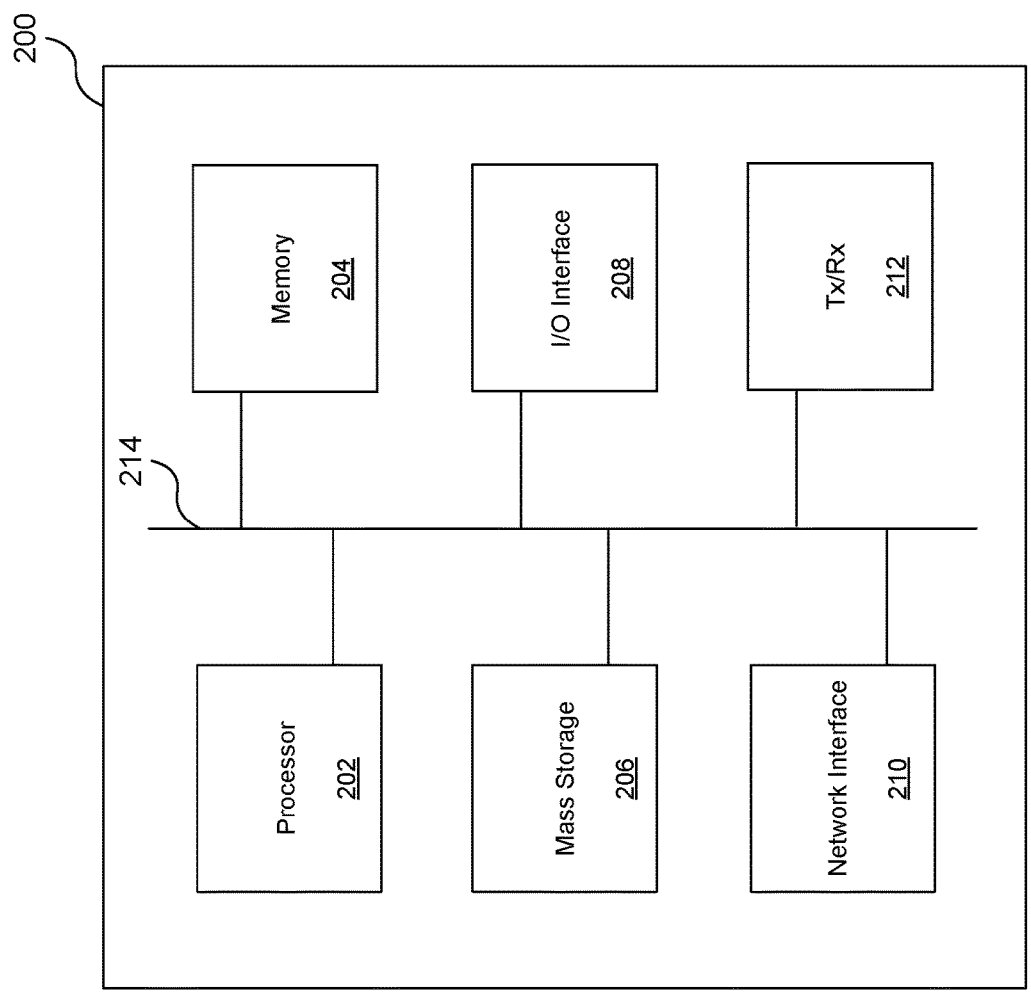
FIG. 15 illustrates an embodiment of a hardware device that may comprise the PCP/AP or STA, according to embodiments of the present invention.

FIG. 15 is schematic diagram 200 of a hardware device that may comprise Access Points (APs) such as the PCP/AP, or STAs, according to embodiments of the present invention. As shown, the hardware device includes a processor 202, memory 204, non-transitory mass storage 206, I/O interface 208, network interface 210, and a transceiver 212, all of which are communicatively coupled via bi-directional bus 214. According to certain embodiments, any or all of the depicted elements may be utilized, or only a subset of the elements. Further, the hardware device may contain multiple instances of certain elements, such as multiple processors, memories, or transceivers. Also, elements of the hardware device may be directly coupled to other elements without the bi-directional bus.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage may have recorded thereon statements and instructions executable by the processor for performing the aforementioned functions and steps of the PCP/AP or STA.

Embodiments of the present invention disclose A-BFT procedures that can be used for RSS beamforming, for example, under future proposals for the IEEE 802.11 standard. Some embodiments allow for simultaneous transmission of SSW frames from different STAs over multiple channels, some embodiments allow for simultaneous transmission of SSW and E-SSW frames from different STAs over the same channel, and some embodiments comprise a combination of both.

Embodiments of the present invention also disclose a new SSW/SSW-Feedback frame structure, comprising a "Channel Select" subfield which can be used to indicate for example, a selected antenna Sector ID and Antenna ID obtained by training on an indicated channel.

Through the above methods, embodiments of the present invention can reduce the probability of SSW slot collisions, for example, during a backoff procedure, to reduce the beamforming interval and errors during RSS.

Figure 18:
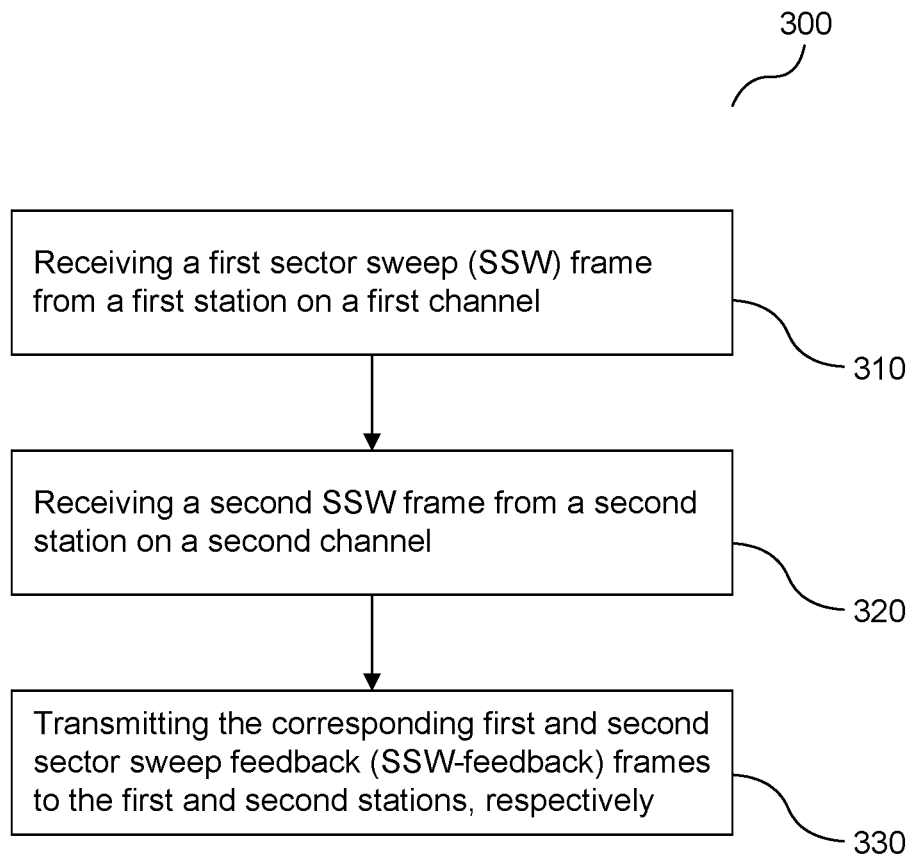
FIGS. 18-21 are embodiments of the method of the present invention.

FIG. 18 is a flowchart of an embodiment 300 of the method of the present invention. More specifically, embodiment 300 is directed toward an association beamforming training (A-BFT) method between an access point communicatively coupleable to a plurality of stations through a plurality of channels. Embodiment 300 comprising receiving a first sector sweep (SSW) frame from a first station on a first channel 310, then receiving a second SSW frame from a second station on a second channel 320 and then transmitting the corresponding first and second sector sweep feedback (SSW-feedback) frames to the first and second stations, respectively 330.

Figure 19:
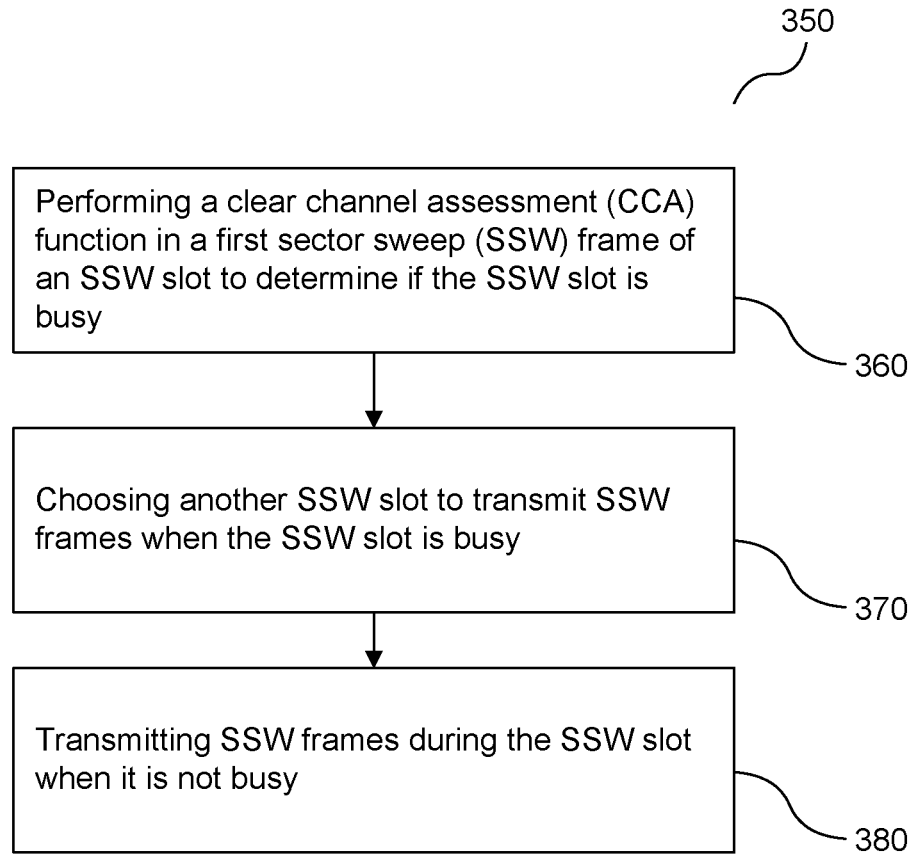

FIG. 19 is a flowchart of an embodiment 350 of the method of the present invention. More specifically, embodiment 350 is directed toward association beamforming training (A-BFT) and comprising performing a clear channel assessment (CCA) function in a first sector sweep (SSW) frame of an SSW slot to determine if the SSW slot is busy 360, then transmitting SSW frames during the SSW slot when it is not busy 380 and then choosing another SSW slot to transmit SSW frames when the SSW slot is busy 370.

Figure 20:
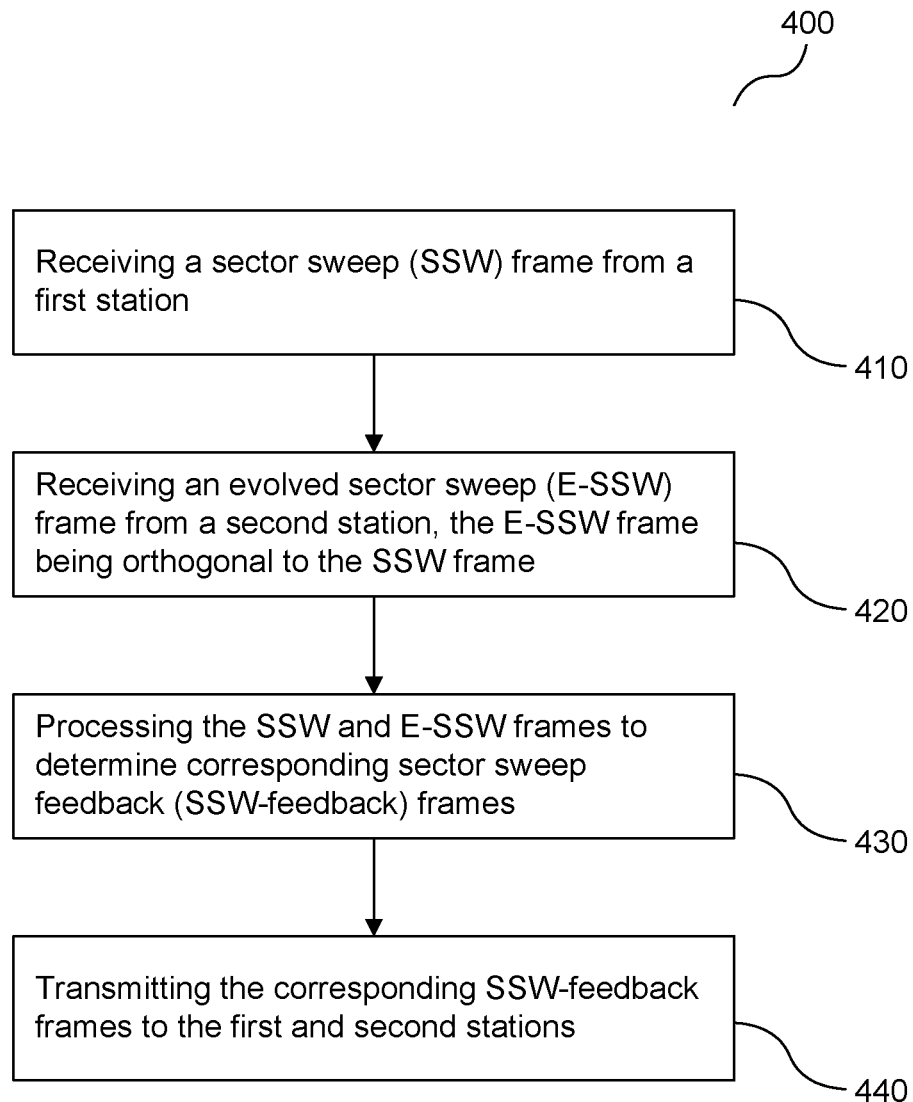

FIG. 20 is a flowchart of an embodiment 400 of the method of the present invention. More specifically, embodiment 400 is directed toward association beamforming training (A-BFT) and comprising receiving a sector sweep (SSW) frame from a first station 410, then receiving an evolved sector sweep (E-SSW) frame from a second station with the E-SSW frame being orthogonal to the SSW frame 420, then processing the SSW and E-SSW frames to determine corresponding sector sweep feedback (SSW-feedback) frames 430 and then transmitting the corresponding SSW-feedback frames to the first and second stations 440.

Figure 21:
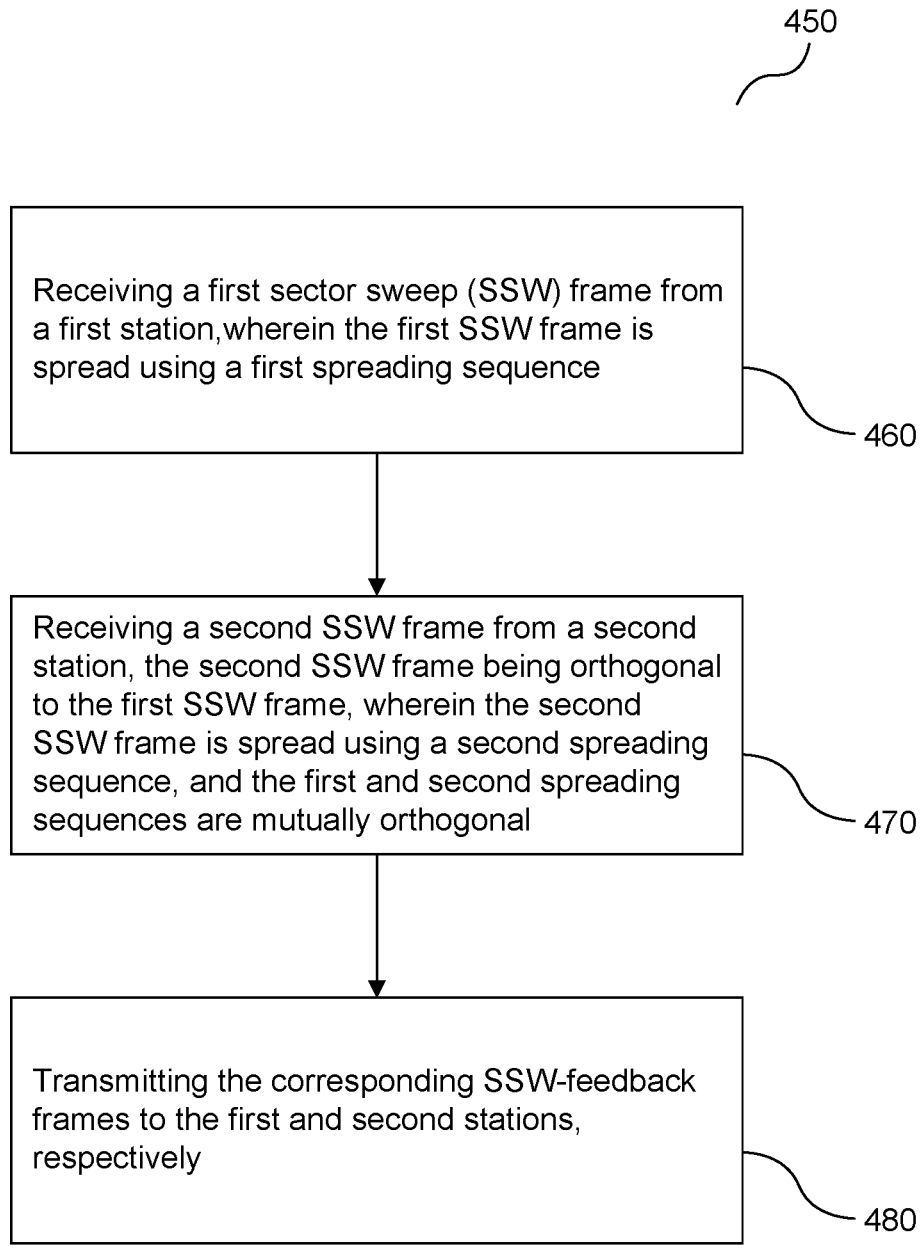

FIG. 21 is a flowchart of an embodiment 450 of the method of the present invention. More specifically, embodiment 450 is directed toward association beamforming training (A-BFT) and comprising receiving a first sector sweep (SSW) frame from a first station 460, then receiving a second SSW frame from a second station, the second SSW frame being orthogonal to the first SSW frame 470 and then transmitting the corresponding SSW-feedback frames to the first and second stations, respectively 480. In embodiment 450, the first SSW frame is spread using a first spreading sequence, the second SSW frame is spread using a second spreading sequence, and the first and second spreading sequences are mutually orthogonal.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. An association beamforming training (A-BFT) method between an access point communicatively coupleable to a plurality of stations through a plurality of frequency channels, the method comprising:
   receiving a first sector sweep (SSW) frame from a first station in a slot on a first frequency channel;
   receiving a second SSW frame from a second station in a slot on a second frequency channel;
   in response to receiving the first and second SSW frames, configuring corresponding first and second sector sweep feedback (SSW-feedback) frames, the corresponding first and second SSW-feedback frames being configured including a respective sector select subfield and a respective DMG antenna select subfield which are based on a measured quality of received SSW frames; and
   transmitting the first SSW-feedback frame to the first station in a second slot on the first frequency channel and transmitting the second SSW-feedback frame to the second station in a second slot on the second frequency channel.

2. The method of claim 1 comprising:
   receiving the first sector sweep (SSW) frame from the first station on the first frequency channel during one association beamforming training interval;
   receiving the second SSW frame from the second station on the second frequency channel during said association beamforming training interval; and
   orthogonally transmitting the first and second sector sweep feedback (SSW-feedback) frames to the first and second stations, respectively during said association beamforming training interval.

3. The method of claim 1 wherein the first SSW-feedback frame is transmitted to the first station on the first frequency channel, and the second SSW-feedback frame is transmitted to the second station on the second frequency channel.

4. The method of claim 1 wherein the first and second SSW frames are received in the same SSW slot.

5. The method of claim 4 wherein the first SSW-feedback frame is transmitted to the first station in a first SSW slot, and the second SSW-feedback frame is transmitted to the second station in a second SSW slot.

6. The method of claim 4 wherein the first SSW-feedback frame is transmitted to the first station in the same SSW slot, and the second SSW-feedback frame is transmitted to the second station in the next available SSW slot.

7. The method of claim 1, wherein the first and second SSW-feedback frames are further configured including a respective channel select subfield that indicates a plurality of frequency channels selectable for transmission in an identified transmission channel.

8. The method of claim 1, wherein the slot on the first frequency channel is the same as the second slot on the first frequency channel.

9. The method of claim 1, wherein the slot on the second frequency channel is the same as the second slot on the second frequency channel.

10. An association beamforming training (A-BFT) method comprising:
    receiving a sector sweep (SSW) frame from a first station;
    receiving an evolved sector sweep (E-SSW) frame from a second station, the E-SSW frame being orthogonal to the SSW frame;
    in response to receiving the SSW and E-SSW frames, configuring corresponding sector sweep feedback (SSW-feedback) frames, the corresponding SSW-feedback frames being configured including a respective sector select subfield and a respective DMG antenna select subfield which are based on a measured quality of received SSW frames; and
    transmitting the corresponding SSW-feedback frames to the first and second stations;
    wherein the E-SSW frame is orthogonal to the SSW frame by one or more of a modulation technique and a coding scheme.

11. The method of claim 10 wherein the E-SSW frame is modulated under a modulation and coding scheme (MCS) to render it orthogonal to the SSW frame.

12. The method of claim 10 wherein the E-SSW frame comprises a Short Training Field (STF) comprising a Golay sequence to render it orthogonal to the SSW frame.

13. The method of claim 10 wherein the E-SSW frame comprises a Channel Estimation Field (CEF) comprising a Golay sequence to render it orthogonal to the SSW frame.

14. The method of claim 10 wherein the SSW and E-SSW frames are received on the same frequency channel.

15. The method of claim 10 wherein the SSW and E-SSW frames are received in the same SSW slot.

16. The method of claim 15 wherein the corresponding SSW-feedback frames for the first and second stations are transmitted over the same frequency channel.

17. The method of claim 15 wherein the corresponding SSW-feedback frames for the first and second stations are transmitted in the same SSW slot.

18. The method of claim 10, wherein the first and second SSW-feedback frames are further configured including a respective channel select subfield that indicates a plurality of frequency channels selectable for transmission in an identified transmission channel.

19. An association beamforming training (A-BFT) method comprising:
    receiving a first sector sweep (SSW) frame from a first station;

receiving a second SSW frame from a second station, the second SSW frame being orthogonal to the first SSW frame;

in response to receiving the first and second SSW frames, configuring corresponding SSW-feedback frames, the corresponding first and second SSW-feedback frames being configured including a respective sector select subfield and a respective DMG antenna select subfield which are based on a measured quality of received SSW frames; and transmitting the corresponding SSW-feedback frames to the first and second stations, respectively;

wherein the first SSW frame is spread using a first spreading sequence, the second SSW frame is spread using a second spreading sequence, and the first and second spreading sequences are mutually orthogonal.

20. The method of claim 19 wherein the first and second spreading sequences cross correlate to zero in at least one central point.

21. The method of claim 20 wherein the first spreading sequence is defined as [+1+1+1+1+1−1+1−1−1−1+1+1+1−1−1+1+1+1−1−1+1−1−1+1−1−1−1+1−1+1−1], transmitted from left to right.

22. The method of claim 20 wherein the second spreading sequence is defined as [−1−1−1−1−1+1−1+1+1+1−1−1−1+1+1−1+1+1−1−1+1−1−1+1−1−1−1+1−1+1−1], transmitted from left to right.

23. The method of claim 20 wherein the first and second SSW frames are received over the same frequency channel.

24. The method of claim 20 wherein the first and second SSW frames are received in the same SSW slot.

25. The method of claim 20 wherein the second SSW frame comprises an evolved SSW (E-SSW) frame.

26. The method of claim 20 wherein the corresponding SSW-feedback frame for the first station is spread using a third spreading sequence, the corresponding SSW-feedback frame for the second station is spread using a fourth spreading sequence, and the third and fourth spreading sequences are mutually orthogonal.

27. The method of claim 19 wherein the first and second spreading sequences are mutually orthogonal within a zero correlation zone.

28. The method of claim 27 wherein the first spreading sequence is defined as [+1+1+1−1+1+1−1+1−1−1−1+1+1+1−1+1+1+1+1−1+1+1−1+1+1+1+1−1−1−1+1−1], transmitted from left to right.

29. The method of claim 27 wherein the second spreading sequence is defined as [−1+1−1−1−1+1+1+1+1−1+1+1−1+1+1+1−1+1−1−1−1+1+1+1−1+1−1−1+1−1−1−1], transmitted from left to right.

30. The method of claim 19, wherein the first and second SSW-feedback frames are further configured including a respective channel select subfield that indicates a plurality of frequency channels selectable for transmission in an identified transmission channel.

* * * * *